United States Patent
Peluso et al.

(10) Patent No.: US 11,972,897 B2
(45) Date of Patent: Apr. 30, 2024

(54) MAGNETIC STRUCTURES AND ARRANGEMENT OF INDUCTIVE PATHS

(71) Applicant: Infineon Technologies Austria AG, Villach (AT)

(72) Inventors: Luca Peluso, Villach (AT); Matthias J. Kasper, Villach (AT); Kennith K. Leong, Villach (AT); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 202 days.

(21) Appl. No.: 17/318,132

(22) Filed: May 12, 2021

(65) Prior Publication Data

US 2022/0367111 A1    Nov. 17, 2022

(51) Int. Cl.
    *H01F 41/00*    (2006.01)
    *H01F 41/02*    (2006.01)
    *H01F 41/06*    (2016.01)

(52) U.S. Cl.
    CPC ......... *H01F 41/0206* (2013.01); *H01F 41/06* (2013.01)

(58) Field of Classification Search
    CPC ....... H02M 3/003; H02M 3/1584; H01F 3/10; H01F 3/14; H01F 17/04; H01F 17/06; H01F 41/0206; H01F 41/06; H01F 2003/106; H01F 2017/067
    See application file for complete search history.

(56) References Cited

U.S. PATENT DOCUMENTS

| | | | |
|---|---|---|---|
| 2001/0052837 A1* | 12/2001 | Walsh | H01F 19/04 336/174 |
| 2008/0067990 A1 | 3/2008 | Wei | |
| 2012/0300500 A1 | 11/2012 | Ikriannikov | |
| 2017/0178797 A1 | 6/2017 | Todorov | |
| 2021/0118601 A1* | 4/2021 | Leong | H02M 3/1584 |
| 2022/0013276 A1* | 1/2022 | Clavette | H01F 17/04 |
| 2022/0276685 A1* | 9/2022 | Peluso | H01F 17/045 |

FOREIGN PATENT DOCUMENTS

| | | |
|---|---|---|
| EP | 1498915 A1 | 1/2005 |
| EP | 2756508 A1 | 7/2014 |
| EP | 3809427 A1 | 4/2021 |
| JP | 2007227914 A | 9/2007 |
| WO | 2006026674 A3 | 5/2007 |
| WO | 2013037696 A1 | 3/2013 |

OTHER PUBLICATIONS

EP Search Report, EP 22 17 2574, dated Oct. 25, 2022, pp. 1-11.

* cited by examiner

*Primary Examiner* — Paul D Kim
(74) *Attorney, Agent, or Firm* — Armis IP Law, LLC

(57) ABSTRACT

According to one configuration, a fabricator receives magnetic permeable material and fabricates an apparatus to include a multi-dimensional arrangement of electrically conductive paths to extend through the magnetic permeable material. Each of the electrically conductive paths is a respective inductive path.

39 Claims, 19 Drawing Sheets

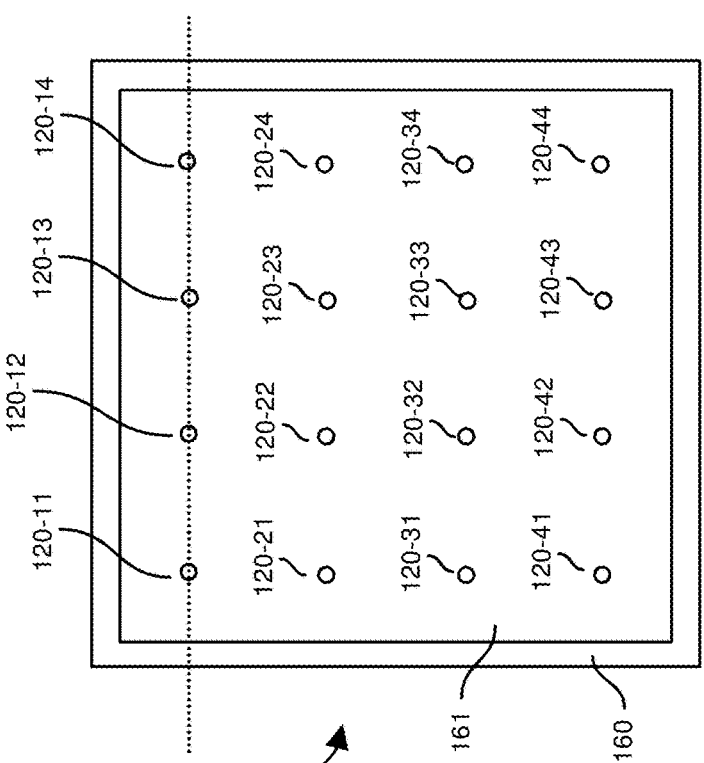
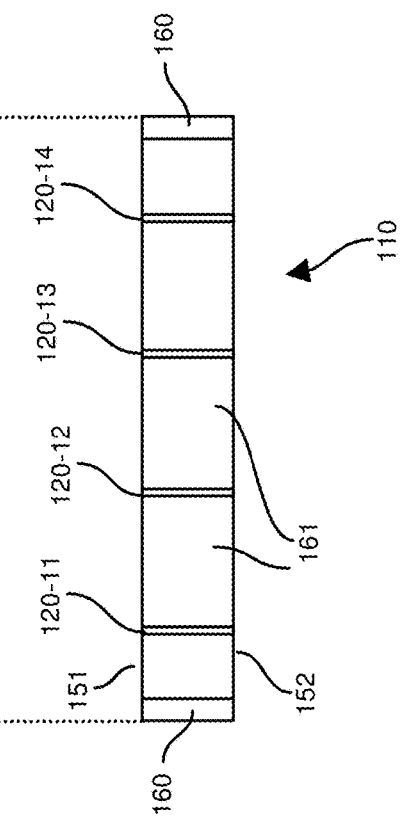
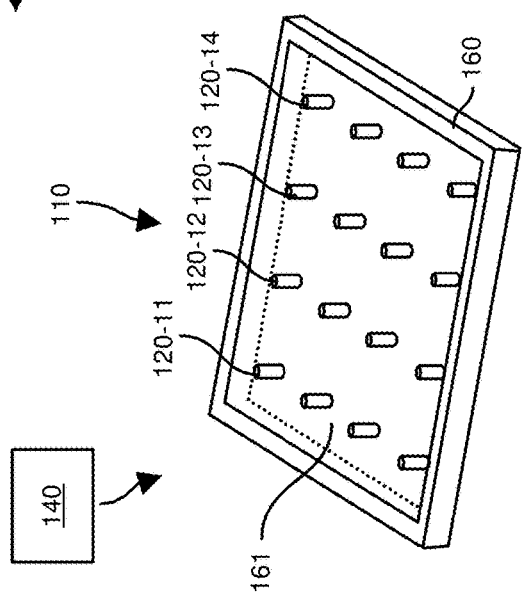
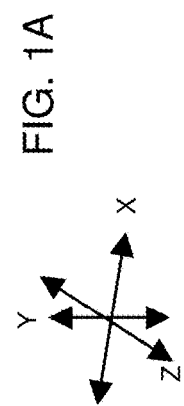

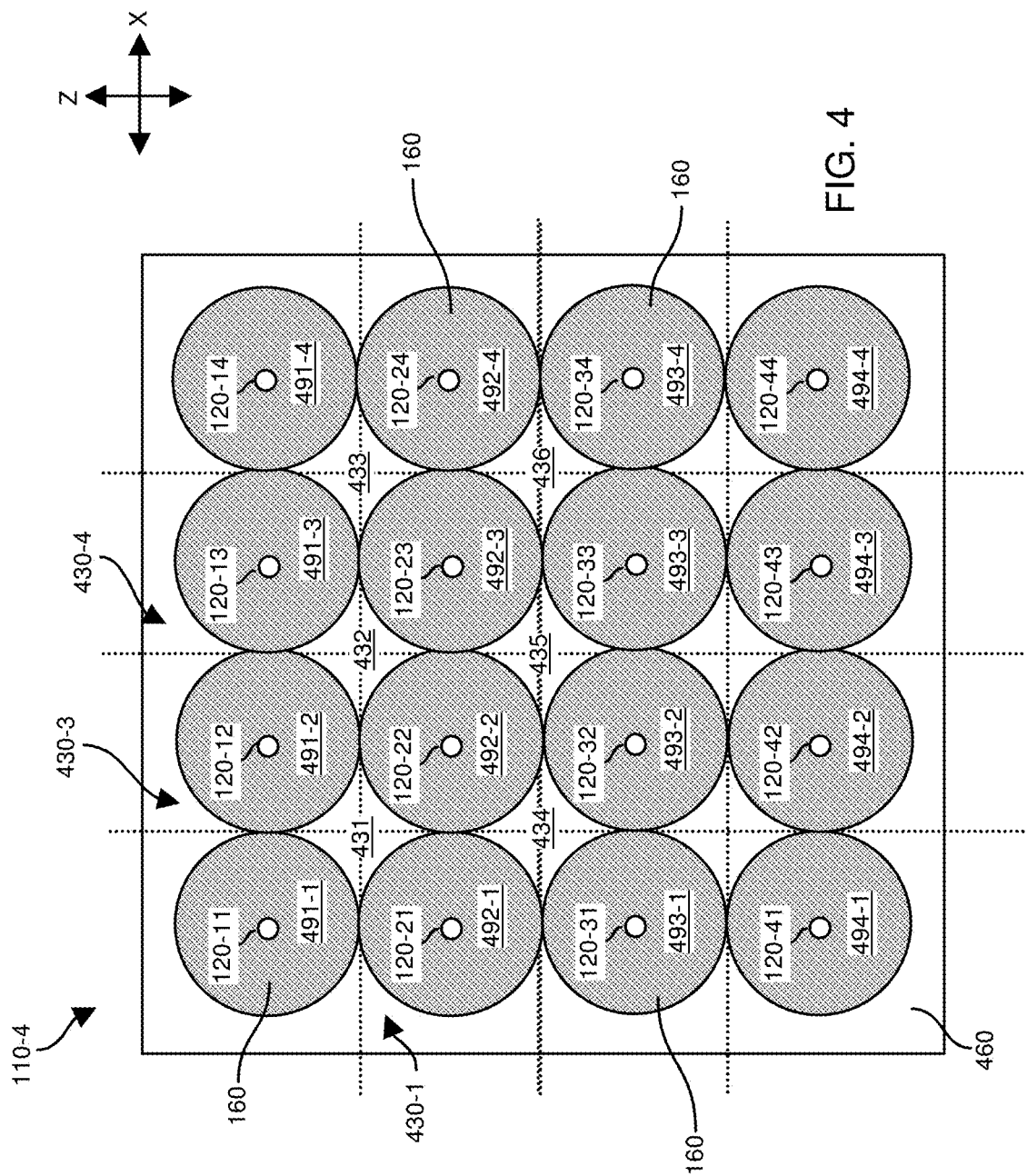

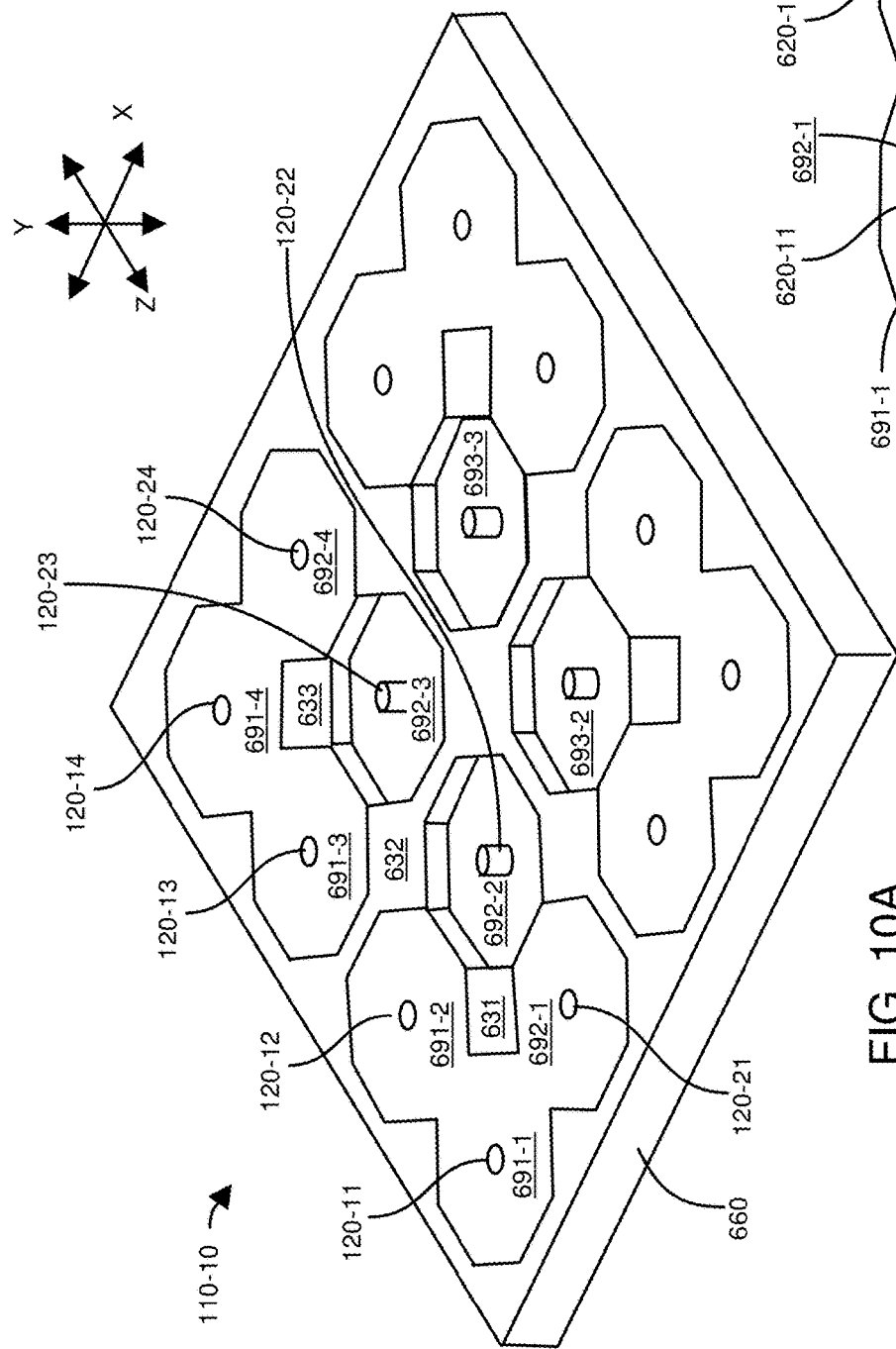
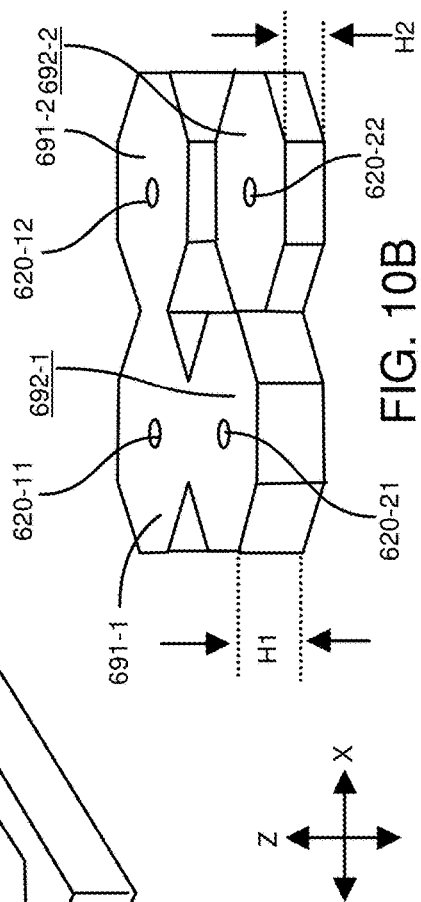
FIG. 10A
FIG. 10B

MAGNETIC STRUCTURES AND ARRANGEMENT OF INDUCTIVE PATHS

BACKGROUND

Conventional switching power supply circuits sometimes include an energy storage component such as an inductor to produce an output voltage that powers a load. For example, to maintain a magnitude of an output voltage within a desired range, a controller controls switching of input current through one or more inductors.

In general, a conventional inductor is a component comprising wire or other conductive material, which is shaped as a coil or helix to increase an amount of magnetic flux through a respective circuit path. Winding of a wire into a coil of multiple turns increases the number of respective magnetic flux lines in a respective inductor component, increasing the magnetic field and thus overall inductance of the respective inductor component.

BRIEF DESCRIPTION

Implementation of clean energy (or so-called green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

For example, this disclosure includes the observation that conventional wire wound inductor components (such as used to support power conversion) are typically bulky and therefore undesirable to implement in certain applications. Such conventional devices inevitably make it difficult to create a compact, efficient, and high current output power supply circuit.

Embodiments herein provide novel and improved inductor components for use in applications such as power conversion. For example, embodiments herein include novel inductor devices, hardware, corresponding use, methods fabricating same, etc.

More specifically, embodiments herein include fabrication of an apparatus (such as hardware, device, component, etc.) such as a circuit component. In one example embodiment, a fabricator fabricates the apparatus to include magnetic permeable material. The fabricator further produces the circuit component to include a multi-dimensional arrangement of electrically conductive paths (inductive paths) extending through the magnetic permeable material such as from one surface of the circuit component to another. Presence of the magnetic permeable material surrounding the electrically conductive paths causes the electrically conductive paths to be inductive paths. Accordingly, the apparatus as discussed herein includes a multi-dimensional arrangement of inductive paths extending through magnetic permeable material.

In further example embodiments, the fabricator as discussed herein fabricates the electrically conductive paths in the multi-dimensional arrangement of the apparatus to include a first electrically conductive path and a second electrically conductive path disposed along a first axis. Additionally, the fabricator fabricates the electrically conductive paths in the apparatus to include a third electrically conductive path in the multi-dimensional arrangement offset with respect to the first axis.

Still further example embodiments herein include, via the fabricator, fabricating the multi-dimensional arrangement of electrically conductive paths to include a first electrically conductive path and a second electrically conductive path; and fabricating the magnetic permeable material to include one or more cutaway portions to reduce inductive coupling between the first electrically conductive path and the second electrically conductive path, the magnetic permeable material being absent from the at least one cutaway portion.

In yet further example embodiments, during fabrication, the fabricator disposes each of the electrically conductive paths as a single turn inductor device in the multi-dimensional arrangement of multiple electrically conductive paths.

In further example embodiments, the fabricator fabricates the electrically conductive paths in the multi-dimensional arrangement to include a first electrically conductive path and a second electrically conductive path. To control respective inductances, the fabricator fabricates a height of the magnetic permeable material with respect to the first electrically conductive path to be different than a height of the magnetic permeable material with respect to the second electrically conductive path.

Further embodiments herein include, via the fabricator, in a similar manner as previously discussed, fabricating the electrically conductive paths in the multi-dimensional arrangement to include a first electrically conductive path and a second electrically conductive path as well as fabricating a volumetric shape of the magnetic permeable material surrounding the first electrically conductive path to be different than a volumetric shape of the magnetic permeable material surrounding the second electrically conductive path. In other words, each cell of the multi-dimensional arrangement can be sized in a different manner depending on a location of the electrically conductive path in the apparatus.

Yet further example embodiments herein include, via the fabricator, fabricating the electrically conductive paths in the multi-dimensional arrangement to include a first electrically conductive path and a second electrically conductive path; and fabricating a volumetric shape of the magnetic permeable material surrounding the first electrically conductive path to be different than a volumetric shape of the magnetic permeable material surrounding the second electrically conductive path.

Further example embodiments herein include, via the fabricator, fabricating the electrically conductive paths in the multi-dimensional arrangement to include a first electrically conductive path and a second electrically conductive path; and fabricating a cross-sectional area of the first electrically conductive path as viewed along a lengthwise axis of the first electrically conductive path to be different than a cross-sectional area of the second electrically conductive path as viewed along a lengthwise axis of the second electrically conductive path in the apparatus (such as circuit component).

The apparatus as discussed herein can be fabricated from one or more different types of magnetic permeable material. For example, in one embodiment, the fabricator fabricates the magnetic permeable material to include a first magnetic permeable material and a second magnetic permeable material. The first magnetic permeable material has a first magnetic permeability; the second magnetic permeable material having a second magnetic permeability different than the first magnetic permeability.

Yet further example embodiments herein include, via the fabricator, fabricating the electrically conductive paths in the multi-dimensional arrangement to include a first electrically conductive path, a second electrically conductive path, and a third electrically conductive path; fabricating the multi-dimensional arrangement to include a first cell in which the first electrically conductive path resides, the first cell defined at least in part by a first portion of the magnetic permeable material surrounding the first electrically conductive path; fabricating the multi-dimensional arrangement to include a second cell in which the second electrically conductive path resides, the second cell defined at least in part by a second portion of the magnetic permeable material surrounding the first electrically conductive path; and fabricating the multi-dimensional arrangement to include a third cell in which the third electrically conductive path resides, the third cell defined at least in part by a third portion of the magnetic permeable material, the third cell being offset with respect to an axis between the first cell and the second cell.

In one embodiment, the fabricator disposes one or more cutaway portions between a first cell and a second cell of the multi-dimensional arrangement, the magnetic permeable material being absent from the one or more cutaway portions. If desired, in one embodiment, the fabricator fills the cutaway portion with electrically conductive material or other suitable material such as other magnetic permeable material.

In further example embodiments, each of the electrically conductive paths in the multi-dimensional arrangement is disposed in a respective cell of the magnetic permeable material; the fabricator envelops each respective cell with electrically conductive material.

In still further example embodiments, the fabricator fabricates the multi-dimensional arrangement of electrically conductive paths to include: a first set of electrically conductive paths, each of the electrically conductive paths in the first set enveloped by respective portions of the magnetic permeable material to form a first set of cells, the first set of cells enveloped by first portions of electrically conductive material; and a second set of electrically conductive paths, each of the electrically conductive paths in the second set enveloped by second portions of the magnetic permeable material to form a second set of cells, the second set of cells enveloped by a second portion of the electrically conductive material.

Additionally, or alternatively, the fabricator fabricates the multi-dimensional arrangement of electrically conductive paths to include: a first set of electrically conductive paths; a first set of cells, each cell in the first set of cells including an electrically conductive path of the first set of electrically conductive paths, each of the electrically conductive paths in the first set of electrically conductive paths enveloped by the magnetic permeable material to form a respective cell of the first set of cells; a first portion of electrically conductive material enveloping the first set of cells; a second set of electrically conductive paths; a second set of cells, each cell in the second set of cells including an electrically conductive path of the second set of electrically conductive paths, each of the electrically conductive paths in the second set of electrically conductive paths enveloped by the magnetic permeable material to form a respective cell of the second set of cells; and a second portion of electrically conductive material enveloping the second set of cells. In one embodiment, the fabricator disposes a first cutaway portion at a center of the first set of cells, the magnetic permeable material being absent from the first cutaway portion; the fabricator disposed a second cutaway portion at a center of the second set of cells, the magnetic permeable material being absent from the second cutaway portion. In further example embodiments, the fabricator fabricates: i) a diameter of a first electrically conductive path in the first set of electrically conductive paths to be larger than a diameter of a second electrically conductive path in the first set of electrically conductive paths; and ii) a diameter of a first electrically conductive path in the second set of electrically conductive paths to be larger than a diameter of a second electrically conductive path in the second set of electrically conductive paths.

In yet further non-limiting example embodiment, the fabricator: i) fabricating the multi-dimensional arrangement of electrically conductive paths to include a first electrically conductive path and a second electrically conductive path; ii) envelops the first electrically conductive path by a first portion of the magnetic permeable material to form a first cell; and iii) envelops the first electrically conductive path by a first portion of the magnetic permeable material to form a second cell, the second cell being larger than the first cell.

These and other more specific embodiments are disclosed in more detail below.

Note that any of the resources (such as a fabricator) implemented in the system as discussed herein can include one or more computerized devices, fabrication equipment, manufacturing equipment, circuit board assemblers, material handlers, controllers, mobile communication devices, handheld or laptop computers, or the like to carry out and/or support any or all of the method operations disclosed herein. In other words, one or more computerized devices or processors or corresponding equipment can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a fabricator such as including computer readable storage medium and/or system having instructions stored thereon to fabricate an inductor component as described herein. The instructions, when executed by computer processor hardware, cause the computer processor hardware (such as one or more co-located or disparately located processor devices or hardware) to: receive magnetic permeable material; and fabricate a multi-dimensional arrangement of electrically conductive paths to extend through the magnetic permeable material, each of the electrically conductive paths being a respective inductive path.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 1A is an example 3-D diagram of an apparatus including a multi-dimensional arrangement of electrically conductive paths in a circuit component according to embodiments herein.

FIG. 1B is an example top view diagram of an apparatus including a multi-dimensional arrangement of electrically conductive paths according to embodiments herein.

FIG. 1C is an example cutaway side view diagram of an apparatus including a multi-dimensional arrangement of electrically conductive paths according to embodiments herein.

FIG. 4 is an example top view diagram of an inductive circuit component including a multi-dimensional arrangement of electrically conductive paths according to embodiments herein.

FIG. 10A is an example 3-D view diagram of a multi-inductor component including multiple groupings of electrically conductive paths and variable magnetic permeable material cell height according to embodiments herein.

FIG. 10B is an example 3-D view diagram of a grouping of electrically conductive paths in a multi-dimensional arrangement and variable magnetic permeable material cell height according to embodiments herein.

Figure 2:
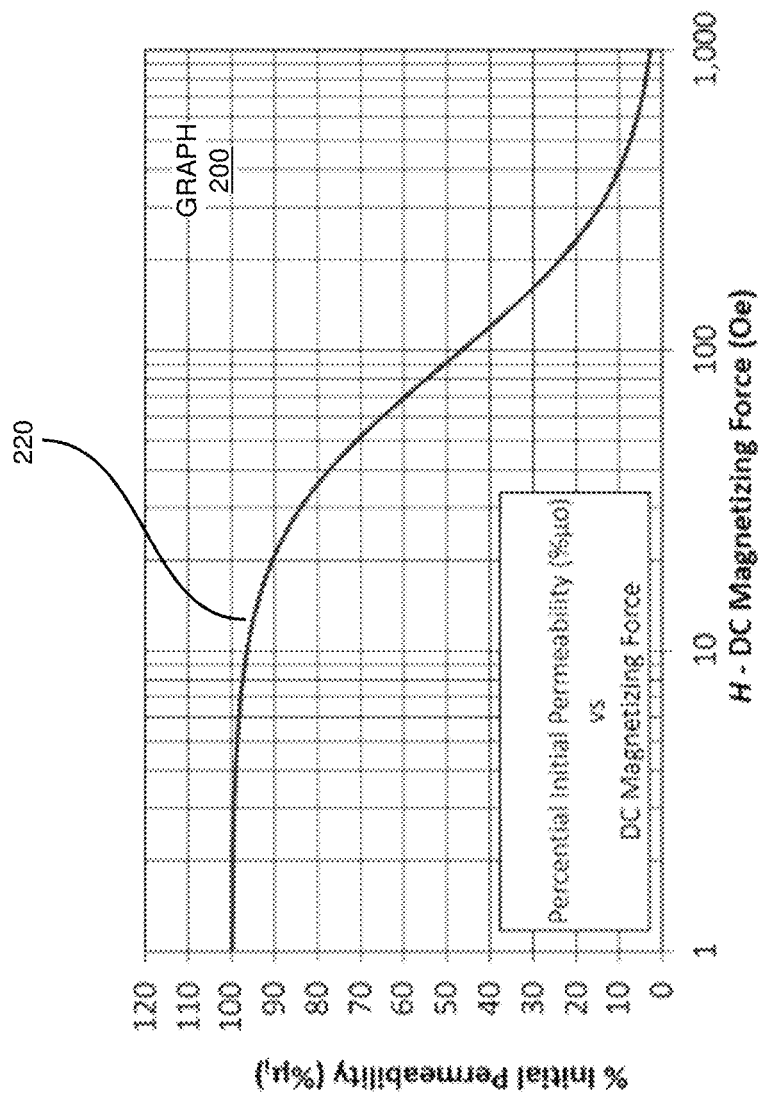
FIG. 2 is an example diagram illustrating magnetic permeability percentage variation versus magnetic field of magnetic permeable material according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, a fabricator receives magnetic permeable material. The fabricator further produces a circuit component to include a multi-dimensional arrangement of electrically conductive paths (inductive paths) such as at least three electrically conductive paths that do not all reside on the same axis. Each of the electrically conductive paths in the multi-dimensional arrangement extend through the magnetic permeable material such as from one surface of the circuit component to another. Presence of the magnetic permeable material surrounding the electrically conductive paths causes the electrically conductive paths to be inductive paths. Accordingly, the apparatus as discussed herein includes a multi-dimensional arrangement of inductive paths extending through magnetic permeable material.

Now, with reference to the drawings, FIG. 1A is an example 3-D diagram of an apparatus including a multi-dimensional arrangement of electrically conductive paths according to embodiments herein.

In this example embodiment, the fabricator 140 receives materials such as one or more of metal (electrically conductive material), metal alloy, magnetic permeable material (such as first magnetic permeable material, second magnetic permeable material, etc.), etc.

Based on the received material, the fabricator 140 fabricates a core of the circuit component 110 (such as a monolithic solid structure or single hardware component) using magnetic permeable material 161 and electrically conductive material to produce the electrically conductive paths 120-11, 120-12, 120-13, 120-14, 120-21, 120-22, . . . , 120-44 (collectively, electrically conductive paths 120) as well as frame 160.

The fabricator 140 fabricates the electrically conductive paths 120 to extend through the magnetic permeable material 161 disposed in the core of the circuit component 110.

Any suitable technique can be used to dispose the electrically conductive paths 120 in the circuit component 110. For example, in one embodiment, the fabricator 140 drills holes through the magnetic permeable material 161 and fills in the holes with electrically conductive material to produce the electrically conductive paths 120.

If desired, each of the electrically conductive paths 120 is surrounded with a layer of insulative material (such as non-electrically conductive material or insulation material) such that the electrically conductive paths do not come in contact with the core magnetic permeable material 161. In other words, each electrically conductive path 120 is optionally coated with an insulation layer of material disposed between the corresponding electrically conductive path and the magnetic permeable material 161.

Note that the implementation of sixteen electrically conductive paths disposed in the inductor circuit component 110 is shown by way of nonlimiting example embodiment only. In still further example embodiments, the multiple electrically conductive paths 120 disposed in the core include a number, N, electrically conductive paths along a first axis, wherein N is any value greater than 2. The multiple electrically conductive paths 120 disposed in the core include a number, M, electrically conductive paths along a second axis, wherein M is any value greater than 2.

Note further that, if desired, the circuit component 110 can be configured as a multi-dimensional arrangement including more than 2 dimensions of arrays of corresponding cells including electrically conductive paths. Each of the two or more dimensions of arrays of cells in the multi-dimensional arrangement of circuit component 110 can be disposed in any orientation with respect to the X, Y, and Z axes.

As its name suggests, the magnetic permeable material 161 surrounding the electrically conductive paths 120 is magnetically permeable. The magnetic permeable material 160 can be fabricated from any suitable matter. In one embodiment, by way of non-limiting example embodiment, the core material 120 has a flux permeability between 10-100 Henries/meter or any other suitable values or ranges.

In yet further embodiments, note again that electrically conductive paths 120 can be fabricated from any suitable conductive material such as metal, a metal alloy (combination of multiple different metals including electrically conductive material such as copper, tin, etc.), etc.

Note further that the electrically conductive path 120 can be fabricated as any suitable shape such as rod-shaped, pillar-shaped, etc.

In still further example embodiments, each electrically conductive path in the magnetic permeable material 161 is a non-winding circuit path (such as so-called single turn inductor device) extending through the inductor circuit component 110 along (parallel to) the Y axis. As mentioned, note again that each inductor path (a.k.a., electrically conductive path) disposed in the shared medium (i.e., magnetic permeable material 161) can be fabricated as being cylindrical or any other suitable shape.

Thus, embodiments herein include a novel multiple inductor circuit component 110 comprising a common core (structure) of magnetic permeable material 161. Implementation of multiple inductor devices in the same structure of magnetic permeable material 161 as a multi-dimensional arrangement facilitates mounting or affixing the corresponding circuit component 110 on a respective circuit substrate and assembly of a respective circuit. Implementation of the multiple inductor devices in the same structure (multi-dimensional arrangement) of circuit component 110 (as opposed to individual inductor components) enables fabrication of smaller footprint circuits.

As previously discussed, the state-of-the-art (conventional) multiphase solutions include implementing independent magnetic devices and independent cores for each phase of a power supply rather than providing an integrated monolithic structure (such as circuit component 110) as described herein. Conventional individual inductor components are non-optimal from the point of view of total board space consumption, which leads to a larger sized system. This impacts not only the overall power density of generating power, but also limits options how physically close the inductor components can be placed near a corresponding power load.

Accordingly, in contrast to conventional techniques, embodiments herein propose a monolithic magnetic structure (such as block of magnetic permeable material 161) having a multi-dimensional arrangement of single-turn inductor paths (such as electrically conductive paths 120) as well as frame 160. As further discussed herein, different embodiments include adjustment of the lateral coupling of neighboring phases (electrically conductive paths 120) from a first amount of inductive coupling to potentially no (or much reduced) inductive coupling by means of geometric cut-outs (cutaway portions) of the core magnetic permeable material 161 dispose din the frame 160.

In one embodiment, the frame 160 of electrically conductive material is optional or fabricated from any suitable material.

In certain instances, the magnetic structure (circuit component 110 and corresponding multi-dimensional arrangement of electrically conductive paths 120) as discussed herein in later figures and text enables vertical power flow and the integration of a multi-phase arrangement of single-turn inductors (such as electrically conductive paths 120).

Note further that presence of the magnetic permeable material 161 around each electrically conductive path transforms each electrically conductive path into an inductive path (i.e., inductor device 110). For example, flow of current through a respective electrically conductive path results in generation of respective magnetic flux (in the magnetic permeable material 161) according to the right hand rule.

FIG. 1B is an example top view diagram of an apparatus including a multi-dimensional arrangement of electrically conductive paths according to embodiments herein.

In this example embodiment, the circuit component 110 includes a multi-dimensional arrangement (such as multi-dimensional array, 2 dimensional array, etc.) of electrically conductive paths 120, where m=a number of paths (m=4) in the X-axis and n=a number of paths (n=4) in the Z-axis.

All of the electrically conductive paths 120 (such as inductors or inductor paths) share one magnetic core (i.e., magnetic permeable material 161).

In one nonlimiting example embodiment, each of the electrically conductive paths (such as copper rod or other suitable shape or material) represents a single-turn winding of one inductor belonging to a single phase of a multiphase VRM (Voltage Regulator Module) such as implementing 16 total phases, one electrically conductive path per phase. The amount of coupling between the windings varies depending on the embodiment and can be reduced as indicated below.

In further example embodiments, the frame 160 (perimeter casing) enveloping the core of magnetic permeable material 161 in the circuit component 110 is fabricated from electrically conductive material. In one embodiment, the core 2D magnetic structure of magnetic permeable material 161 is surrounded (enveloped) by a frame 160 fabricated from electrically conductive material. In one embodiment, the frame 160 serves as a return path for the inductor current (associated with the electrically conductive paths) and provides a ground plane or encasing which acts as a magnetic shielding to reduce electromagnetic interference and emission.

In one nonlimiting example embodiment, the circuit component 140 is fabricated in accordance with the following parameters:
  Initial core permeability of magnetic permeable material 161 is μ: 80
  μ vs Hdc curve as depicted in FIG. 2
  Core and frame 160 height: 2 millimeters (mm)
  Single inductive cell XZ dimensions: 7.5 mm×7.5 mm
  Total core XZ area dimension: 30 mm
  Electrically conductive path 120 diameter: 1 mm
  Supported Current through each electrically conductive path: 70 Adc (Amperes DC).

However, as previously discussed, these dimensions vary depending on the embodiment.

Again, in one embodiment, each of the electrically conductive paths 120 is a single turn inductor device (path) disposed in the multi-dimensional arrangement of multiple electrically conductive paths 120 in the circuit component 110.

In further example embodiments, with reference to FIG. 1B, the electrically conductive paths 120 in the multi-dimensional arrangement of the circuit component 110 include a first electrically conductive path 120-1 and a second electrically conductive path 120-2 disposed along a first axis (such as parallel to the X-axis). The circuit component 110 further includes at least an additional electrically conductive path (such as any of electrically conductive path 120-21, 120-22, . . . , 120-31, 120-32, etc.,) in the multi-dimensional arrangement offset with respect to the first axis.

FIG. 1C is an example cutaway side view diagram of an apparatus including a multi-dimensional arrangement of electrically conductive paths according to embodiments herein.

The side view of circuit component 110 in FIG. 1C illustrates that each of the electrically conductive paths 120 in the circuit component 110 extends from the top surface 151 of the circuit component 110 to the bottom surface 152 of the circuit component 110.

More specifically, a first axial end of the electrically conductive path 120-11 in a first row is exposed on the top surface 151 of the circuit component 110; a second axial end of the electrically conductive path 120-11 is exposed on the bottom surface 152 of the circuit component 110. A first axial end of the electrically conductive path 120-12 in the first row is exposed on the top surface 151 of the circuit component 110; a second axial end of the electrically conductive path 120-12 is exposed on the bottom surface 152 of the circuit component 110, and so on.

A first axial end of the electrically conductive path 120-21 in a second row is exposed on the top surface 151 of the circuit component 110; a second axial end of the electrically conductive path 120-21 is exposed on the bottom surface 152 of the circuit component 110. A first axial end of the electrically conductive path 120-22 in the second row is exposed on the top surface 151 of the circuit component 110; a second axial end of the electrically conductive path 120-22 is exposed on the bottom surface 152 of the circuit component 110, and so on.

Thus, in a similar manner, each of the electrically conductive paths 120 has a first axial end exposed on the top surface 151 and a second axial end exposed on the bottom surface 152 of the circuit component 110.

Exposure on the surfaces of the circuit component 110 enable connectivity to other circuit components.

Referring again to FIG. 1A, note that each of the electrically conductive paths and corresponding portion of magnetic permeable material enveloping the electrically conductive path in the multi-dimensional arrangement of circuit component 110 can be considered a respective inductive cell. In such an instance, the example circuit component 110 in FIG. 1A includes 16 cells such as including: i) a first cell in which the electrically conductive path 120-11 resides, the first cell defined at least in part by a first portion of the magnetically permeable material 160 surrounding (enveloping) the first electrically conductive path 120-11, ii) a second cell in which the electrically conductive path 120-12 resides, the second cell defined at least in part by a second portion of the magnetically permeable material 160 surrounding the electrically conductive path 120-12; iii) a third cell in which the electrically conductive path 120-13 resides, the third cell defined at least in part by a third portion of the magnetically permeable material 160 surrounding the electrically conductive path 120-13; . . . ; and v) a fifth cell in which the electrically conductive path 120-21 resides, the fifth cell defined at least in part by a fifth portion of the magnetic permeable material 160, the fifth cell being offset with respect to an axis between the first cell and the second cell; and so on.

In one embodiment, a surface and cross-sectional view (such as in the X-Z plane) of each of the multiple instances of circuit component 110 as further discussed herein is the same at any depth of the Y-axis.

FIG. 2 is an example diagram illustrating magnetic permeability percentage variation versus magnetic field of magnetic permeable material according to embodiments herein.

In one embodiment, by way of non-limiting example, the circuit component 110 in FIG. 1A is fabricated as follows:
Initial core permeability µ of magnetically permeable material 161 is: 80
The corresponding µ vs Hdc curve as depicted in FIG. 2
Core height of magnetic permeable material 161 in Y-axis: 2 mm
Single inductive cell XZ dimensions: 6.75 mm×6.75 mm
Total core XZ dimension: 30 mm
Electrically conductive path diameter (such as copper rod diameter): 1 mm
Current: 70 AmpsDC.

As previously discussed, the curve 220 in graph 200 of FIG. 2 illustrates the percentage variation of Permeability vs DC magnetic field associated with magnetic permeable material 161. As shown, the permeability softly decreases with increasing DC magnetic field, i.e., by increasing the current in a respective electrically conductive path (e.g., single-turn inductor).

Referring again to FIG. 1A, note that the resulting inductance for each electrically conductive path (such as electrically conductive path 120-11, 120-14, 120-41, and 120-44 in a corner of the circuit component 110 is 31 nH, while the inductance of the four inductive paths (electrically conductive paths 120-22, 120-23, 120-32, and 120-33) in the center of the circuit component 110 has an inductance of 59 nH; all the other inductive paths (such as electrically conductive paths) have an inductance of 24.5 nH. The reason why the inductance varies lies in the fact that the inner electrically conductive paths experience a higher amount of flux cancelation. The core magnetic permeable material 160 is hence locally less saturated in these regions, yielding a higher inductance for the inner phases.

For the four phases in the corner of the circuit component 110, the various fluxes arising from all the other phases balance themselves, while for the remaining eight phases, the fluxes arising from the other phases sum with respect to each other, leading to a higher saturation of the core and therefore a lower inductance value.

This structural imbalance in inductance values as well as the magnetic coupling between the inductive paths in the circuit component 110 can be reduced by applying cutaway portions, implementation of different magnetic permeable material, and changing the dimensions of the circuit component 110 as further discussed below.

Thus, as further discussed herein, embodiments herein include different configurations of the circuit component and implementation of cutaway portions to control inductive coupling and a magnitude of inductance associated with each inductive path (electrically conductive path) in the circuit component.

Figure 3B:
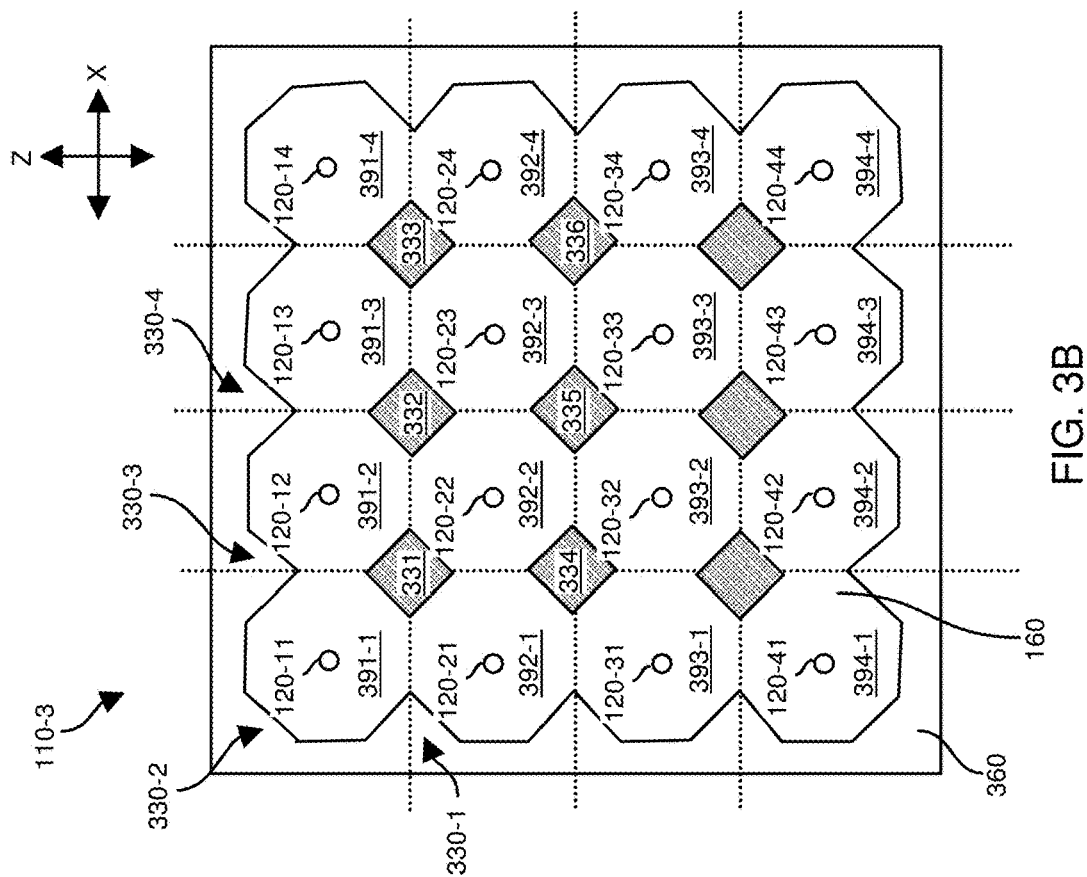
FIG. 3B is an example top view diagram of an inductive circuit component including a multi-dimensional arrangement of electrically conductive paths and multiple cutaway portions according to embodiments herein.
Figure 3A:
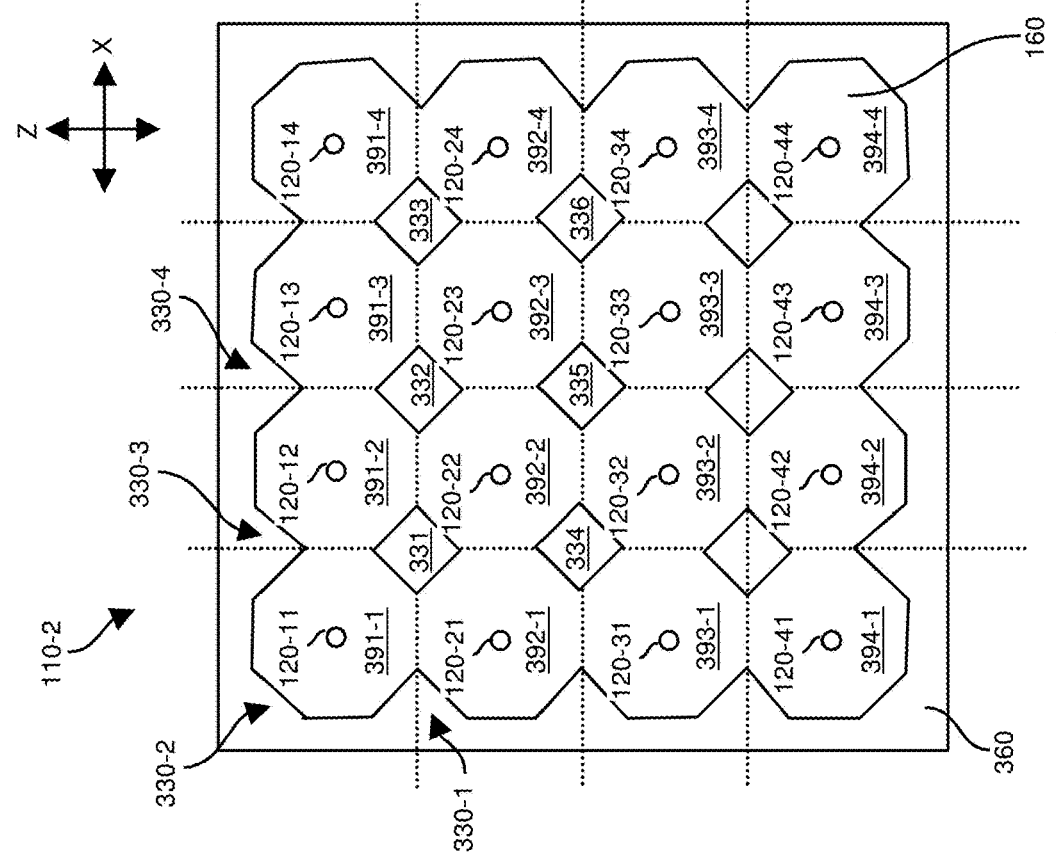
FIG. 3A is an example top view diagram of an inductive circuit component including a multi-dimensional arrangement of electrically conductive paths and multiple cutaway portions according to embodiments herein.

FIG. 3A is an example top view diagram of an inductive circuit component including a multi-dimensional arrangement of electrically conductive paths and multiple cutaway portions according to embodiments herein.

In one embodiment, a cross-sectional view (in plane X-Z) of the instance of circuit component 110-2 is the same at any depth of the Y-axis.

Note that further embodiments herein include, during fabrication, tuning the cells in the multi-dimensional arrangement of circuit component 110 to control an inductance of each electrically conductive path as well as coupling between the electrically conductive paths. For example, reduced inductance coupling between adjacent electrically conductive paths can be achieved by removing, for each inductor cell, fractions (portions) of the shared core magnetic permeable material 160 in certain locations.

For example, in a similar manner as previously discussed, the instance of circuit component 110-2 of FIG. 3A includes: i) a first row of electrically conductive paths 120-11, 120-12, 120-13, and 120-14; ii) a second row of electrically conductive paths 120-21, 120-22, 120-23, and 120-24; iii) a third row of electrically conductive paths 120-31, 120-32, 120-33, and 120-34; and iv) a fourth row of electrically conductive paths 120-41, 120-42, 120-43, and 120-44.

In this example embodiment, each cell of the circuit component 110-2 includes a respective electrically conductive path. For example, cell 391-1 includes a portion of magnetic permeable material 160 enveloping electrically conductive path 120-11; cell 391-2 includes a portion of magnetic permeable material 160 enveloping electrically conductive path 120-12; cell 391-3 includes a portion of magnetic permeable material 160 enveloping electrically conductive path 120-13; cell 391-4 includes a portion of magnetic permeable material 160 enveloping electrically conductive path 120-14; cell 392-1 includes a portion of magnetic permeable material 160 enveloping electrically conductive path 120-21; cell 392-2 includes a portion of magnetic permeable material 160 enveloping electrically conductive path 120-22; cell 392-3 includes a portion of magnetic permeable material 160 enveloping electrically conductive path 120-23; cell 392-4 includes a portion of magnetic permeable material 160 enveloping electrically conductive path 120-24; and so on.

As further shown, the magnetic permeable material 160 in circuit component 110-2 includes multiple cutaway portions 330-1, 330-2, 330-3, 330-4, etc., (collectively, cutaway portions 330) to reduce inductive coupling. The dimensions of the cutaway portions can vary depending on an amount of desired reduced inductive coupling.

The magnetic permeable material 160 is absent from each of the cutaway portions 330. In one embodiment, each of the cutaway portions 330 is filled with electrically conductive material to produce the frame 360 enveloping the multi-dimensional arrangement of electrically conductive paths 120. Alternatively, the cutaway portion can be filled with any other suitable material.

In still further example embodiments, the instance of circuit component 110-2 includes additional cutaway portions 331, 332, 333, 334, 335, 336, etc., in which the magnetic permeable material 160 is absent from the circuit component 110-2 between corresponding cells.

More specifically, circuit component 110-2 includes: i) cutaway portion 331 disposed amongst cell 391-1, cell 391-2, cell 392-1, and cell 392-2; ii) cutaway portion 332 disposed amongst cell 391-2, cell 391-3, cell 392-2, and cell 392-3; iii) cutaway portion 333 disposed amongst cell 391-3, cell 391-4, cell 392-3, and cell 392-4; iv) cutaway portion 334 disposed amongst cell 392-1, cell 392-2, cell 393-1, and cell 393-2; and so on. The presence of the cutaway portions reduces inductive coupling between the electrically conductive paths.

In one embodiment, as shown in FIG. 3A, one or more of the cutaway portions 331, 332, 33, 334, 335, 336, etc., in an interior of the circuit component 110-2 are filled with electrically conductive material such as metal. Alternatively, in FIG. 3B, one or more of the cutaway portions 331, 332, 333, 334, 335, 336, etc., in an interior of the instance of circuit component 110-2 are filled with air, gas, vacuum, etc.

In one embodiment, the fabricator 140 controls the dimensions of the cutaway portions and corresponding number of cutaway portions fabricated in the circuit component 110 to control a degree to which the pairs of adjacent electrically conductive path are inductively coupled to each other.

In one embodiment, the void (such as created space associated with cutaway portions) in magnetic permeable material 161 can be filled for example with metal for better heat-spreading. In an example embodiment, the internal cutaway portions (such as cutaway portions 331, 332, 333, 334, 335, etc., are electrically isolated from the frame 360 such as a GND return path.

FIG. 4 is an example top view diagram of an inductive circuit component including a multi-dimensional arrangement of electrically conductive paths according to embodiments herein.

Note that further embodiments herein include, during fabrication, providing isolation between the cells in the multi-dimensional arrangement of circuit component 110-2. For example, reduced inductance coupling between adjacent electrically conductive paths can be achieved by removing, for each inductor cell, fractions (portions) of the shared core magnetic permeable material 160 in certain locations.

More specifically, in a similar manner as previously discussed, the instance of circuit component 110-4 of FIG. 4 includes: i) a first row of electrically conductive paths 120-11, 120-12, 120-13, and 120-14; ii) a second row of electrically conductive paths 120-21, 120-22, 120-23, and 120-24; iii) a third row of electrically conductive paths 120-31, 120-32, 120-33, and 120-34; and iv) a fourth row of electrically conductive paths 120 11, 120-12, 120-13, and 120-14.

In this example embodiment, each cell of the circuit component 110-4 includes a respective electrically conductive path. For example, cell 491-1 includes a portion of magnetic permeable material 160 enveloping electrically conductive path 120-11; cell 491-2 includes a portion of magnetic permeable material 160 enveloping electrically conductive path 120-12; cell 491-3 includes a portion of magnetic permeable material 160 enveloping electrically conductive path 120-13; cell 491-4 includes a portion of magnetic permeable material 160 enveloping electrically conductive path 120-14; cell 492-1 includes a portion of magnetic permeable material 160 enveloping electrically conductive path 120-21; cell 492-2 includes a portion of magnetic permeable material 160 enveloping electrically conductive path 120-22; cell 492-3 includes a portion of magnetic permeable material 160 enveloping electrically conductive path 120-23; cell 492-4 includes a portion of magnetic permeable material 160 enveloping electrically conductive path 120-24; and so on.

As further shown, the magnetic permeable material 160 in circuit component 110-4 includes multiple cutaway portions 430-1, 430-2, 430-3, 430-4, etc., (collectively, cutaway portions 430) to reduce inductive coupling. The dimensions of the cutaway portions can vary depending on an amount of reduced inductive coupling.

The magnetic permeable material 160 is absent from each of the cutaway portions 430. In one embodiment, each of the one or more cutaway portions 430 is filled with electrically conductive material to produce the frame 460 enveloping the multi-dimensional arrangement of electrically conductive paths 120.

In still further example embodiments, the instance of circuit component 110-4 includes additional cutaway portions 431, 432, 433, 434, 435, 436, etc., in which the magnetic permeable material 160 is absent from the circuit component 110-4 and corresponding cells.

More specifically, circuit component 110-4 includes: i) cutaway portion 431 disposed amongst cell 491-1, cell 491-2, cell 492-1, and cell 492-2; ii) cutaway portion 432 disposed amongst cell 491-2, cell 491-3, cell 492-2, and cell 492-32; iii) cutaway portion 433 disposed amongst cell 491-3, cell 491-4, cell 492-3, and cell 492-4; iv) cutaway portion 334 disposed amongst cell 492-1, cell 492-2, cell 493-1, and cell 493-2; and so on.

In one embodiment, cutaway portions are connected to the frame 460 and are fabricated from the same electrically conductive material.

The presence of the cutaway portions in between respective cells of the circuit component 110-4 reduces inductive coupling between the electrically conductive paths.

In one embodiment, as shown in FIG. 4, one or more the cutaway portions 431, 432, 433, 434, 435, 436, etc., in an interior of the circuit component 110-4 are filled with electrically conductive material such as metal, other magnetic permeable material, etc. Alternatively, the cutaway portions 431, 432, 433, 434, 435, 436, etc., in an interior of the instance of circuit component 110-4 are filled with air, gas, vacuum, etc.

Figure 5:
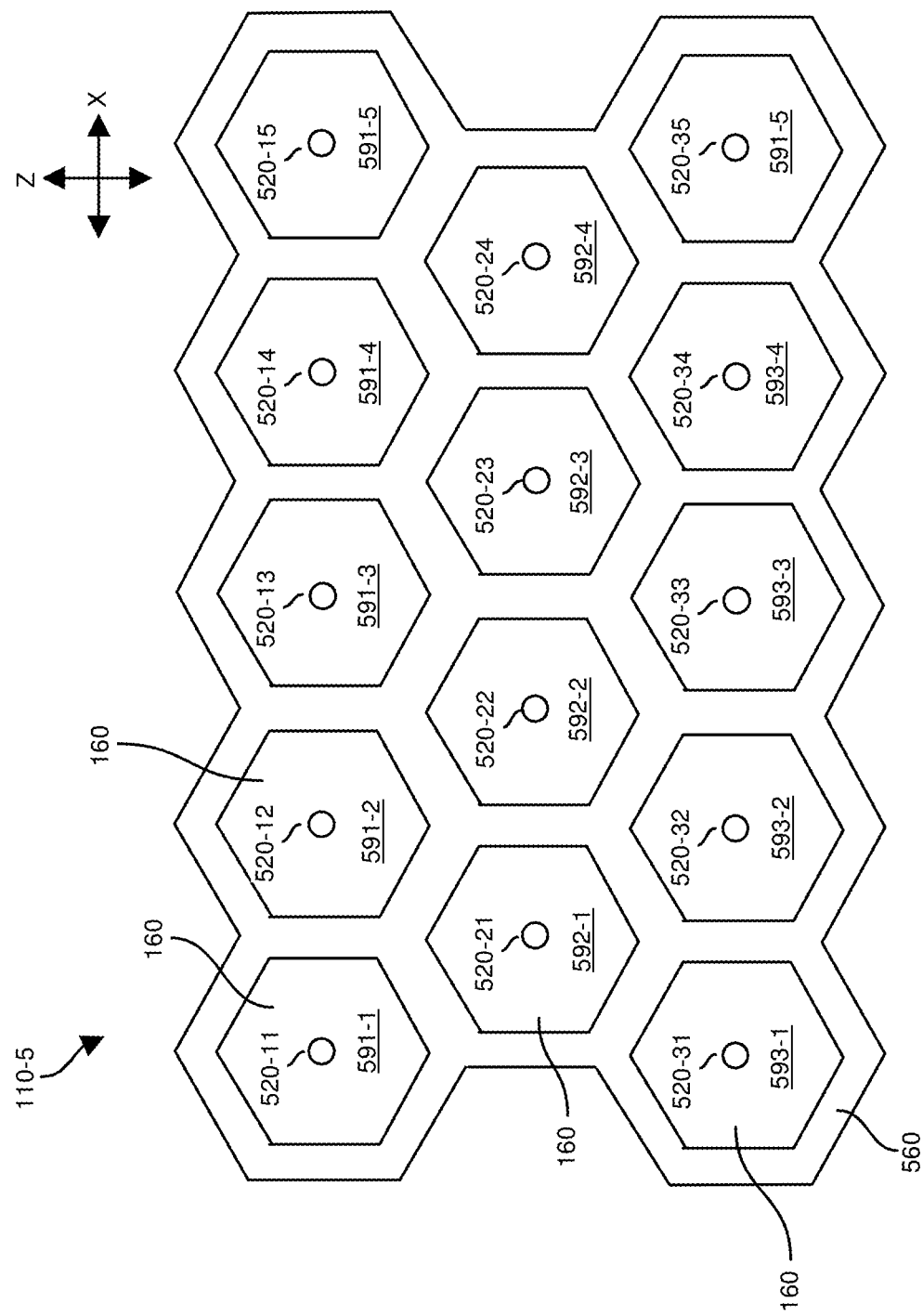
FIG. 5 is an example top view diagram of an inductive circuit component including a multi-dimensional arrangement of electrically conductive paths according to embodiments herein.

FIG. 5 is an example top view diagram of an inductive circuit component including a multi-dimensional arrangement of electrically conductive paths according to embodiments herein.

In this example embodiment, the instance of circuit component 110-5 includes multiple cells individually isolated from each other via frame 560 (electrically conductive material such as metal). For example, in one embodiment, each of the electrically conductive paths 520 is disposed in a respective cell of the magnetically permeable material; each respective cell is individually enveloped by electrically conductive material of frame 560.

More specifically, the circuit component 110-5 includes cell 591-1 comprising: i) electrically conductive path 520-11 enveloped by a respective portion of magnetic permeable material 160; ii) electrically conductive path 520-12 enveloped by a respective portion of magnetic permeable material 160; iii) electrically conductive path 520-13 enveloped by a portion of magnetic permeable material 160; iv) electrically conductive path 520-14 enveloped by a respective portion of magnetic permeable material 160; and so on.

As previously discussed, each cell in the circuit component 110-5 is surrounded or enveloped by corresponding electrically conductive material associated with the frame 560. For example, the cell 591-11 is surrounded by a first portion of the frame 560; the cell 591-12 is surrounded by a second portion of the frame 560; the cell 591-13 is surrounded by a third portion of the frame 560; the cell 591-14 and is surrounded by a fourth portion of the frame 560; and so on.

Figure 6:
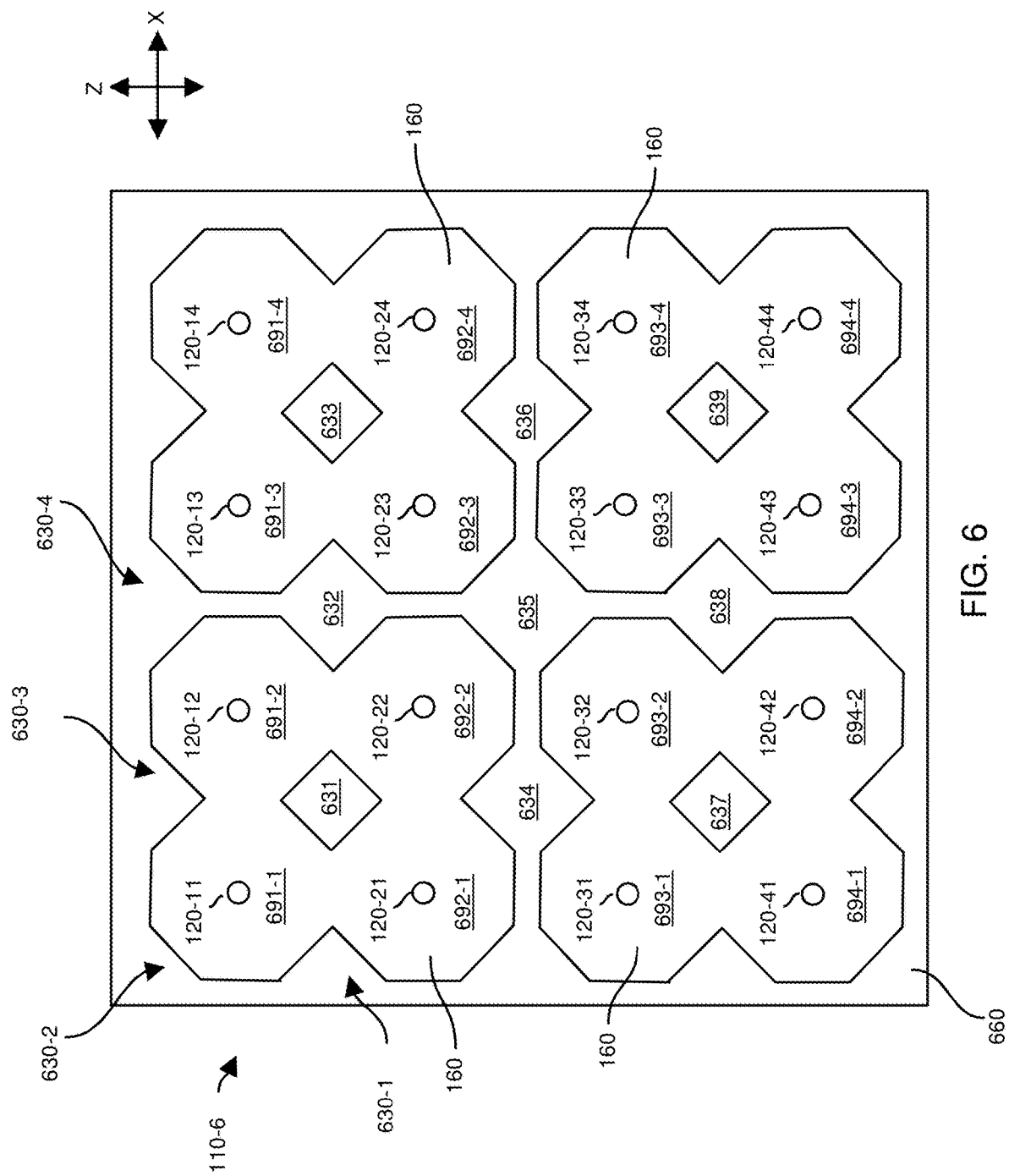
FIG. 6 is an example top view diagram of a multi-inductor component including multiple groupings of electrically conductive paths according to embodiments herein.

FIG. 6 is an example top view diagram of a multi-inductor component including multiple groupings of electrically conductive paths according to embodiments herein.

Note that further embodiments herein include, during fabrication, providing isolation between groups of the cells in the multi-dimensional arrangement of circuit component 110-6. For example, reduced inductance coupling between adjacent electrically conductive paths can be achieved by removing, for each inductor cell, fractions (portions) of the shared core magnetic permeable material 160 in certain locations and enveloping the groups of cells with frame 660 (electrically conductive material such as metal).

More specifically, in a similar manner as previously discussed, the instance of circuit component 110-6 of FIG. 6 includes: i) a first row of electrically conductive paths 120-11, 120-12, 120-13, and 120-14; ii) a second row of electrically conductive paths 120-21, 120-22, 120-23, and 120-24; iii) a third row of electrically conductive paths 120-31, 120-32, 120-33, and 120-34; and iv) a fourth row of electrically conductive paths 120-41, 120-42, 120-43, and 120-44.

In this example embodiment, each cell of the circuit component 110-6 includes a respective electrically conductive path. For example, cell 691-1 includes a portion of magnetic permeable material 160 enveloping electrically conductive path 120-11; cell 691-2 includes a portion of magnetic permeable material 160 enveloping electrically conductive path 120-12; cell 691-3 includes a portion of magnetic permeable material 160 enveloping electrically conductive path 120-13; cell 691-4 includes a portion of magnetic permeable material 160 enveloping electrically conductive path 120-14; cell 692-1 includes a portion of magnetic permeable material 160 enveloping electrically conductive path 120-21; cell 692-2 includes a portion of magnetic permeable material 160 enveloping electrically conductive path 120-22; cell 692-3 includes a portion of magnetic permeable material 160 enveloping electrically conductive path 120-23; cell 692-4 includes a portion of magnetic permeable material 160 enveloping electrically conductive path 120-24; and so on.

As further shown, the magnetic permeable material 160 in circuit component 110-6 includes multiple cutaway portions 630-1, 630-2, 630-3, 630-4, etc., (collectively, cutaway portions 630) to reduce inductive coupling amongst electrically conductive paths. The dimensions of the cutaway portions can vary depending on an amount of reduced inductive coupling.

The magnetic permeable material 160 is absent from each of the cutaway portions 630. In one embodiment, each of the one or more cutaway portions 630 is filled with electrically conductive material or other material to produce the frame 660 enveloping the multi-dimensional arrangement of electrically conductive paths 120.

In still further example embodiments, the instance of circuit component 110-6 includes additional cutaway portions 631, 632, 633, 634, 635, 636, etc., in which the magnetic permeable material 160 is absent from the circuit component 110-6 and corresponding cells.

More specifically, circuit component 110-6 includes: i) cutaway portion 631 disposed amongst cell 691-1, cell 691-2, cell 692-1, and cell 692-2; ii) cutaway portion 632 disposed amongst cell 691-2, cell 691-3, cell 692-2, and cell 692-3; iii) cutaway portion 633 disposed amongst cell 691-3, cell 691-4, cell 692-3, and cell 692-4; iv) cutaway portion 634 disposed amongst cell 692-1, cell 692-2, cell 693-1, and cell 693-2; and so on.

The presence of the cutaway portions in between respective cells of the circuit component 110-6 reduces inductive coupling between the electrically conductive paths within each respective group of electrically conductive paths.

In one embodiment, as shown in FIG. 6, one or more the cutaway portions 631, 632, 633, 634, 635, 636, etc., in an interior of the circuit component 110-6 are filled with electrically conductive material such as metal. Alternatively, the cutaway portions 631, 632, 633, 634, 635, 636, etc., in an interior of the instance of circuit component 110-6 are filled with different magnetic permeable material, air, gas, vacuum, etc.

Accordingly, embodiments of the circuit component 110-6 include: i) a first set of electrically conductive paths (120-11, 120-12, 120-21, 120-22), each of the electrically conductive paths in the first set enveloped by the magnetic permeable material 160 to form a first set of cells (691-1, 691-2, 692-1, 692-2), the first set of cells enveloped by a first portion of electrically conductive material associated with the frame 660; and ii) a second set of electrically conductive paths (120-13, 120-14, 120-23, 120-24), each of the electrically conductive paths in the second set enveloped by the magnetic permeable material to form a second set of cells (691-3, 691-4, 692-3, 692-4), the second set of cells enveloped by a second portion of the electrically conductive material of frame 660. Cutaway portion 631 is disposed between the cell 691-1 and the cell 692-2, the magnetically permeable material being absent from the cutaway portion 631 and other cutaway portions.

Thus, in yet another embodiment of the circuit component, the cells are divided into multiple sub-cores. The main benefit of such an implementation lies in making the impedance of the current return path equal for each phase, moreover the magnetic coupling is also further reduced which can be beneficial in some specific applications. In one embodiment, in the circuit component 110-6 (4×4 magnetic matrix split in 4 sub-modules), the frame 660 of electrically conductive material surrounding the 4 sub-cores provides a current return path with similar impedance for all the 16 phases.

In one embodiment, in conjunction with the coupling reduction brought by the sub-core arrangement, the mismatch between the inductances is also greatly reduced. Considering the following characteristics of an example circuit component 110-6:

Initial core (magnetic permeable material 160) material 160 permeability μ: 80

μ vs Hdc curve as depicted in FIG. 2

Core height of circuit component in Y-axis is: 2 mm

Single inductive cell XZ dimensions: 7.5 mm×7.5 mm

Total core XZ dimension: 30 mm electrically conductive path diameter: 1 mm

Current: 70 Adc.

In one embodiment, the inductances associated with the electrically conductive paths 120 in circuit component 110-6 are approximate 37.5 nH for the four inductors (cell 692-2, cell 692-3, cell 693-2, and cell 693-3) in the center of the circuit component 110-6 and 32.5 nH for all the other cells. As mentioned, the reason of this mismatch is the high flux cancelation experienced by the 4 middle inductors (cell 692-2, cell 692-3, cell 693-2, and cell 693-3) which lead to lower soft-saturation of the core and therefore to a higher local permeability according to the μ vs Hdc curve of FIG. 2.

Note further that, in some applications of implementing the circuit component 110-6, it may be required that all the inductors of the multiphase magnetic structure of circuit component 110-6) have the same or near same inductance. As an example, inductance associated with the cells in circuit component 110-6 may be different values resulting in issues such as higher peak currents in the outer phases or slower transient response of the inner phases.

The following embodiment can solve this problem: in order to equalize the inductances in the circuit component 110, embodiments herein include reducing the inductance of the phases that experience the highest flux cancelation, which in the example of FIG. 6 are the four phases (cell 692-2, cell 692-3, cell 693-2, and cell 693-3) in the middle of the multi-dimensional arrangement of circuit component 110-6. To do so it is necessary to increase the reluctance of their relative cores. The reluctance formula is the following:

$$R = l_m / \mu A_{core}$$

Where $l_m$ is the mean magnetic path length, $A_{core}$ is the core area seen by the flux and $\mu$ is the magnetic permeability.

Figure 7:
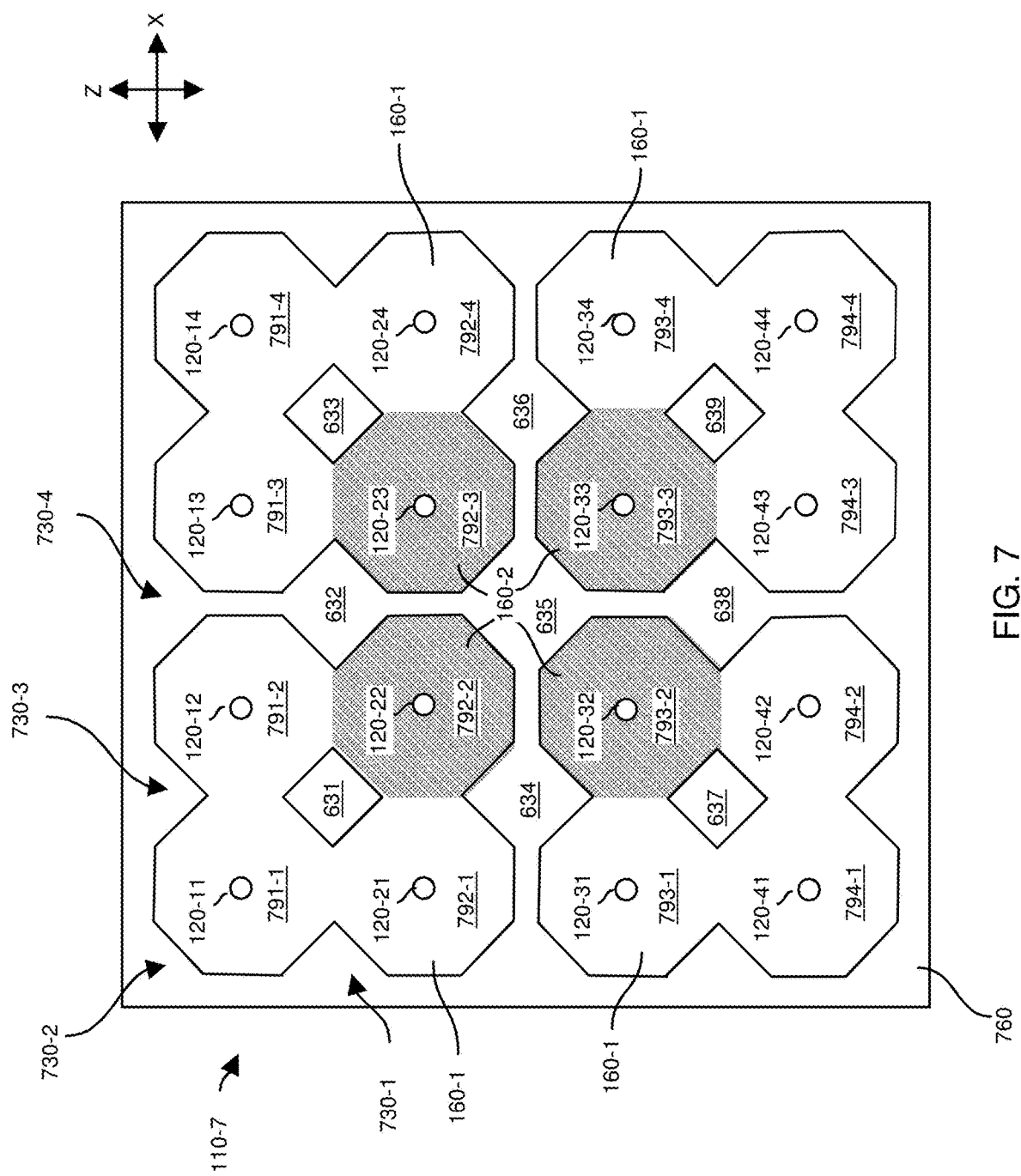
FIG. 7 is an example top view diagram of a multi-inductor component including multiple groupings of electrically conductive paths and variability of magnetic permeable material amongst cells according to embodiments herein.

One possible solution is to employ for cores experiencing a higher flux cancelation a material with a lower permeability (at the point of the Hdc field the core is designed for) with respect to the cores of the outer phases as described in FIG. 7.

FIG. 7 is an example top view diagram of a multi-inductor component including multiple groupings of electrically conductive paths and variability of magnetic permeable material amongst cells according to embodiments herein.

In addition to grouping multiple cells of the multi-dimensional arrangement of circuit component 110-7 and framing such groupings via framing 760, embodiments herein include implementing different magnetic permeable material in each cell.

For example, in one embodiment, the fabricator 140 fabricates the cells 791-1, 791-2, 791-3, 791-4, 792-1, 792-4, 793-1, 793-4, 794-1, 794-2, 794-3, and 794-4 using first magnetic permeable material 160-1. The first magnetic permeable material 160 has a first magnetic permeability. The fabricator 140 fabricates the cells 792-2, 792-3, 793-2, and 793-3 using second magnetic permeable material 160-2. The second magnetic permeable material 160-2 has a second magnetic permeability.

Accordingly, in one embodiment, the magnetic permeable material 160 includes first magnetic permeable material 160-1 and second magnetic permeable material 160-2; the first magnetic permeable material 160-1 has a first magnetic permeability, the second magnetic permeable material 160-2 has a second magnetic permeability. In one embodiment, the second magnetic permeable material 160-2 has a lower magnetic permeability than the first magnetic permeable material 160-1. In one embodiment, fabrication of the circuit component 110-6 using different magnetic permeable material adjusts the cells in each grouping to be nearer to a common inductance value, reducing inductance mismatch amongst the cells.

Figure 8:
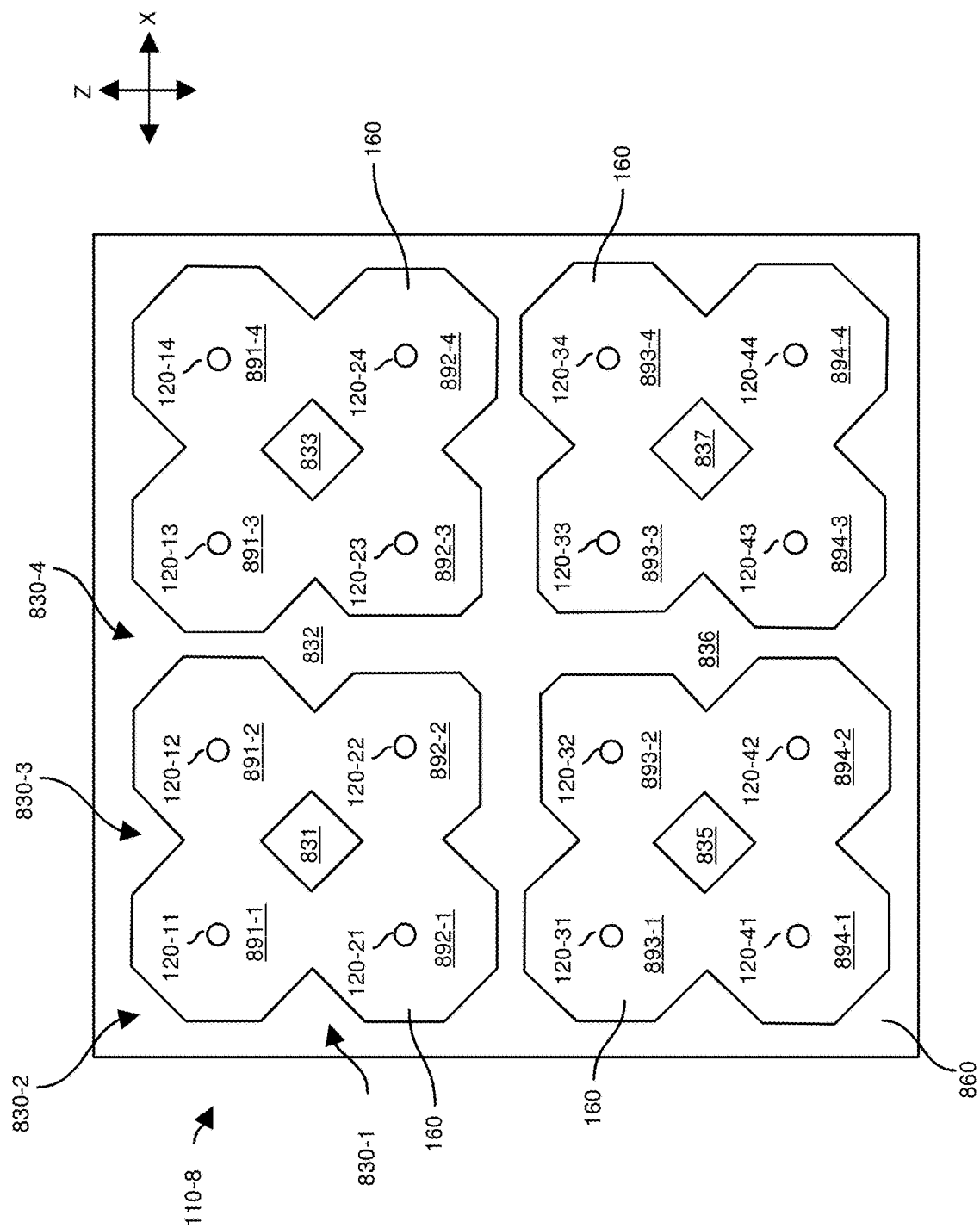
FIG. 8 is an example top view diagram of a multi-inductor component including multiple groupings of electrically conductive paths and variable magnetic permeable material cell size according to embodiments herein.

FIG. 8 is an example top view diagram of a multi-inductor component including multiple groupings of electrically conductive paths and variable magnetic permeable material cell size according to embodiments herein.

In further example embodiments, determining the precise material to fine tune the inductance of the inner cores of the circuit component 110-6 may be non-trivial. Embodiments herein further include looking at the reluctance formula another way we can find alternative solutions: for example, embodiments herein include increasing the reluctance of the cores, which are experiencing the highest flux cancelation, by reducing their cross section area (A_core) intentionally through introducing asymmetries in their geometries with respect to the cores belonging to all the other phases. In one embodiment, as in FIG. 8, the area of the inner cores (such as cells 892-2, 892-3, 893-2, and 893-3) is reduced by cutting-off material from their outer part. In one embodiment, this results in more equalized inductances for each cell such as around 32.5 nH for each cell.

In other words, embodiments herein include adjusting dimensions of the magnetic permeable material surrounding the electrically conductive paths to be different dimensions. For example, each of the cells 892-2, 892-3, 893-2, and 893-3 is are smaller in size (top view cross-sectional area) than a corresponding common size associated with each of cells 891-1, 891-2, 891-3, 891-4, 892-1, 892-4, 893-1, 893-4, 894-1, 894-2, 894-3, and 894-4. Because the circuit component 110-8 has the same cross-sectional view in the X-Z plane for any depth of Y, the volumetric shape of the magnetic permeable material surrounding the first electrically conductive paths 120-11, 120-12, 120-13, 120-14, 120-21, 120-24, 120-31, 120-34, 120-41, 120-42, 120-43, and 120-44 is different than a volumetric shape of the magnetic permeable material surrounding the second electrically conductive paths 120-22, 120-23, 120-32, and 120-33.

Figure 9:
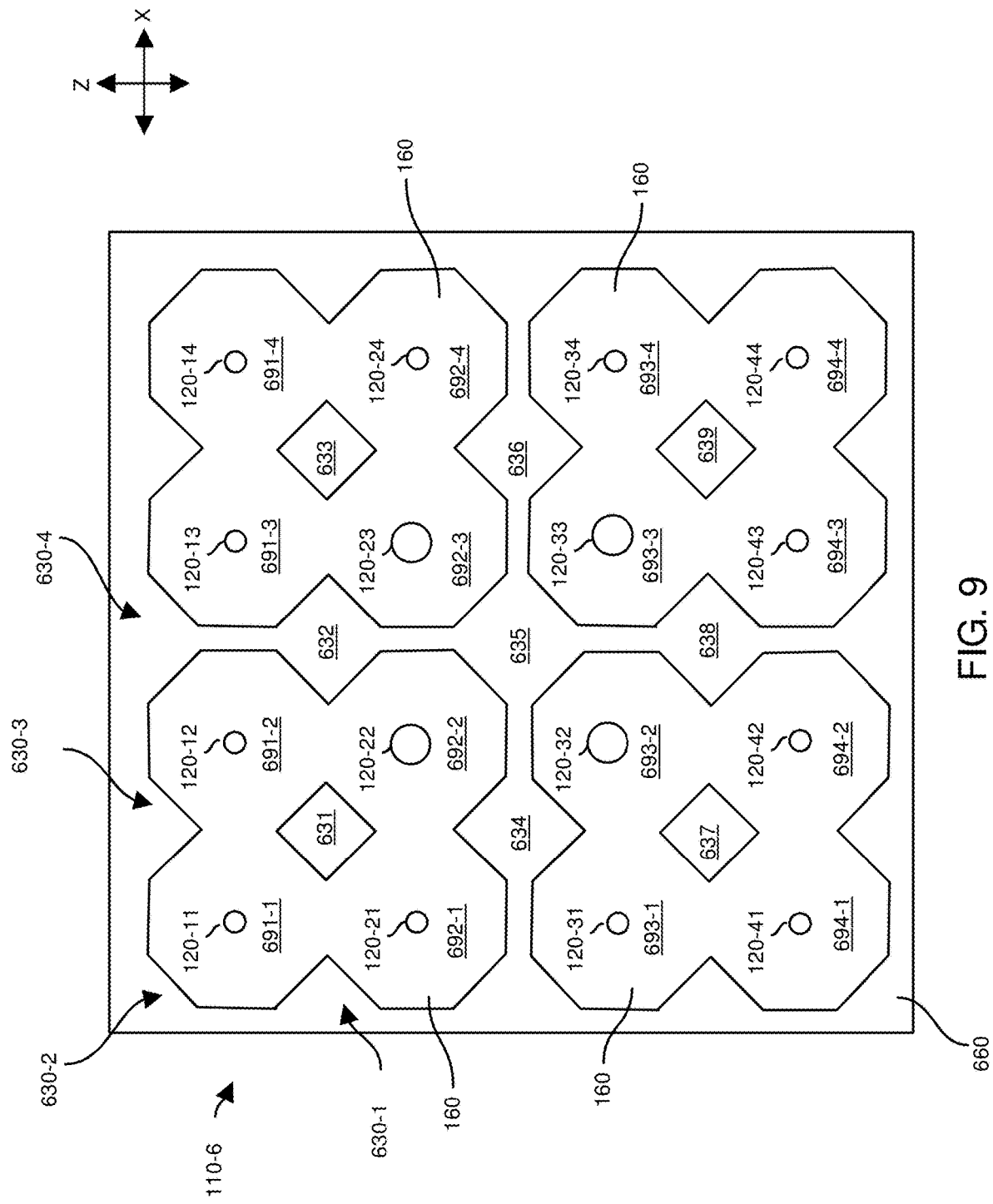
FIG. 9 is an example top view diagram of a multi-inductor component including multiple groupings of electrically conductive paths and variable electrically conductive path diameters according to embodiments herein.

FIG. 9 is an example top view diagram of a multi-inductor component including multiple groupings of electrically conductive paths and variable path diameters according to embodiments herein.

In addition to grouping multiple cells of the multi-dimensional arrangement of circuit component 110-6 and framing such groupings, embodiments herein include implementing electrically conductive paths of different diameters depending on their location in the circuit component 110-6.

For example, the fabricator 140 fabricates each of the electrically conductive paths 120-22, 120-23, 120-32, 120-33 to be a first diameter value, which is different and greater than the common diameter value of the electrically conductive paths 120-11, 120-12, 120-13, 120-14, 120-21, 120-24, 120-31, 120-34, 120-41, 120-42, 120-43, and 120-44.

Thus, in one embodiment, a cross-sectional area of the first electrically conductive paths 120-22, 120-23, 120-32, 120-33 as viewed along a lengthwise axis (Y-axis) of the first electrically conductive paths is different (and greater) than a cross-sectional area of the second electrically conductive paths 120-11, 120-12, 120-13, 120-14, 120-21, 120-24, 120-31, 120-34, 120-41, 120-42, 120-43, and 120-44 as viewed along a lengthwise axis (Y-axis) of the second electrically conductive paths. Thus, embodiments herein include adjusting the diameter of one or more electrically conductive paths 120 to control a magnitude of the inductance associated with each of the cells in the circuit component 110. For example, by increasing the diameter of the electrically conductive path and keeping the same single cell dimensions, this reduces the core-area. Adjusting the cross-section core area (hence the volumetric shape) controls a magnitude of the inductance.

FIG. 10A is an example 3-D view diagram of a multi-inductor component including multiple groupings of electrically conductive paths and variable cell height according to embodiments herein.

In addition to grouping multiple cells of the multi-dimensional arrangement of circuit component 110-6 and framing such groupings, embodiments herein include implementing the corresponding magnetic permeable material in each cell to be a specific height depending on their location in instance of the circuit component 110-10.

For example, the fabricator 140 fabricates each of the cells 691-1, 691-2, 691-3, 691-4, 692-1, 692-4, 693-1, 693-4, 694-1, 694-2, 694-3, 694-4 of magnetic permeable material 160 to be a first height H1 value, which is different and greater than the common height value of the magnetic permeable material in cells 692-2, 692-3, 693-2, 693-3.

Thus, in one embodiment, a height H1 of the magnetic permeable material 160 in the Y-axis for a first group of one or more cells is greater than a height H2 of the magnetic permeable material 160 in the Y-axis for a second group of one or more cells of the circuit component 110-10.

FIG. 10B is an example 3-D view diagram of a grouping of electrically conductive paths in a multi-dimensional arrangement and variable cell height according to embodiments herein.

As shown, the height H1 of cells 691-1, 691-2, and 692-1 is different than the height H2 of the cell 692-2.

Figure 11:
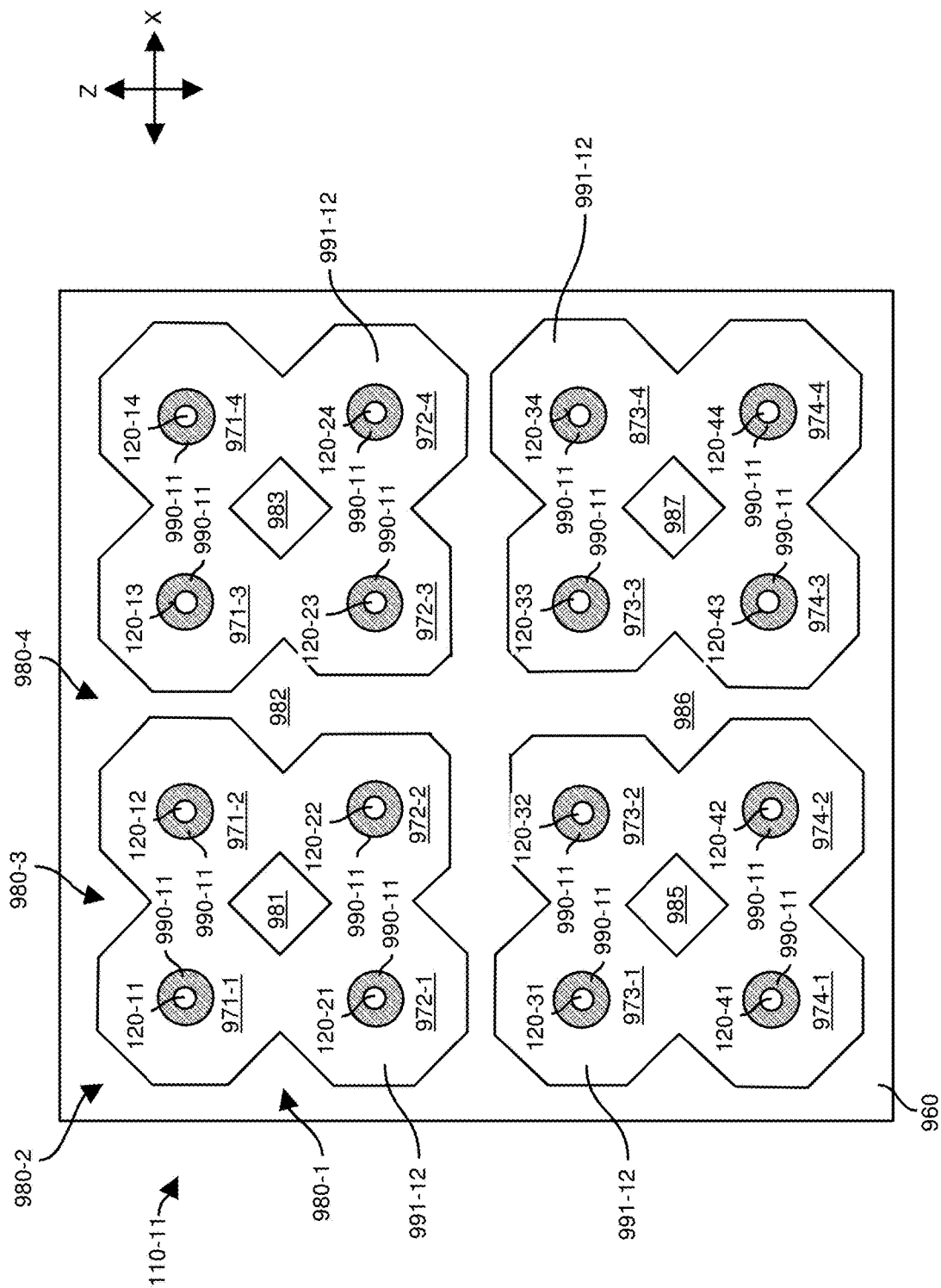
FIG. 11 is an example top view diagram of a multi-inductor component including multiple groupings of electrically conductive paths and variability of magnetic permeable material within one or more cells according to embodiments herein.

FIG. 11 is an example top view diagram of a multi-inductor component including multiple groupings of electrically conductive paths and variability of magnetic permeable material within one or more cells according to embodiments herein.

Further embodiments herein include implementing a multi-layered cell of different magnetic permeable material to achieve different or desired inductance values in the circuit component 110-11.

For example, in addition to, or as an alternative to adjusting a size of the cell as previously discussed in FIG. 8, embodiments herein include varying the magnetic permeability of magnetic permeable material as a function of the distance from the corresponding electrically conductive path. More specifically, the cell 971-1 includes first magnetic permeable material 990-11 (of a first magnetic permeability) surrounding the electrically conductive path 120-11; the cell 971-1 further includes second magnetic permeable material 991-12 surrounding the first magnetic permeable material 991-11.

Cell 971-2 includes first magnetic permeable material 990-11 (of a first magnetic permeability) surrounding the electrically conductive path 120-12; the cell 971-2 further includes second magnetic permeable material 991-12 surrounding the first magnetic permeable material 991-11.

In a similar manner, each of the cells in circuit component 110-11 is fabricated using two or more different types of magnetic permeable material.

Figure 12:
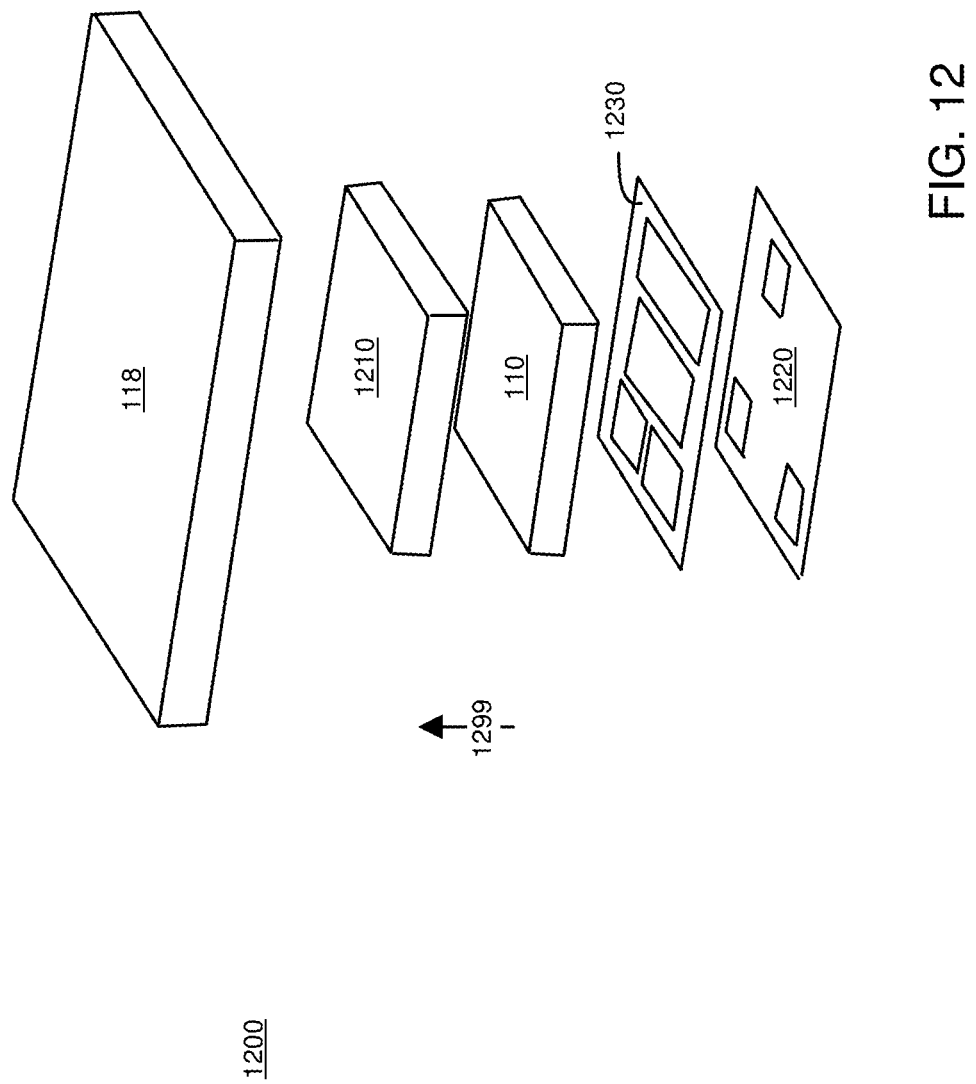
FIG. 12 is an example exploded view diagram illustrating an exploded 3-D view of a substrate, voltage regulator circuit assembly, and dynamic load according to embodiments herein.

FIG. 12 is an example exploded view diagram illustrating an exploded 3-D view of a substrate, voltage regulator circuit assembly, and dynamic load according to embodiments herein.

In this example embodiment, the circuit component 110 is disposed in a respective circuit 1200 between layer of circuit components 1230 and the voltage converter 1210. The flow of power 1299 is conveyed through the circuit 1200 from the substrate 1220 through the circuit components 1230, inductive paths of circuit component 110, and the voltage converter 1210 to the load 118.

Note that the electrically conductive paths as discussed herein can be connected in any suitable manner. For example, via additional connective hardware associated with layer of circuit components 1230 and layer of circuit components in the voltage converter 1210, any of all of the electrically conductive paths 120 (inductive paths) in circuit component 110 can be connected in parallel, connected in series, or a combination of both. Additionally, or alternatively, any or all of the electrically conductive paths in circuit component 110 can be configured to convey respective current independent of other electrically conductive paths in the circuit component 110.

Figure 13:
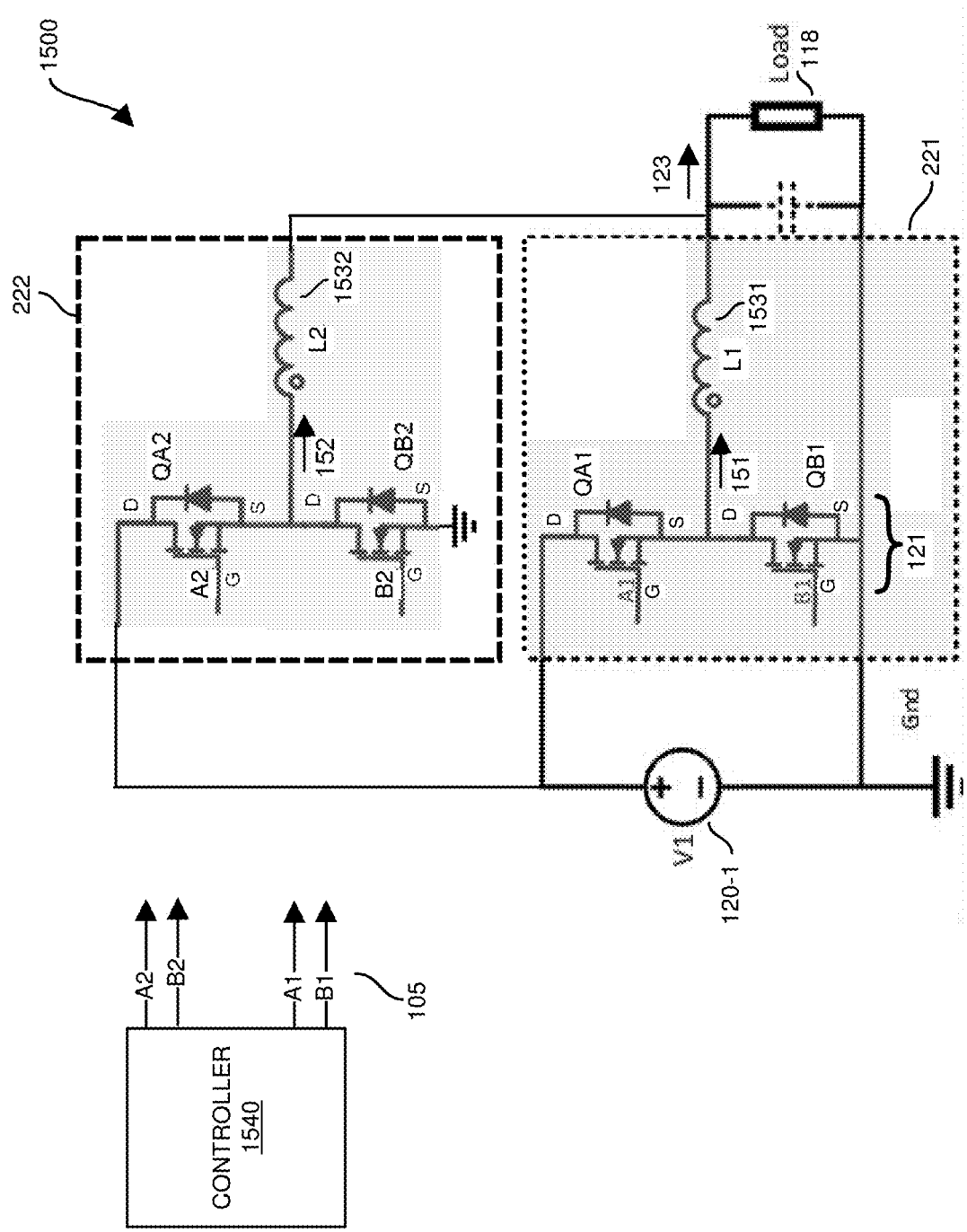
FIG. 13 is an example diagram illustrating connectivity of circuit components in a power supply including an inductor devices according to embodiments herein.

FIG. 13 is an example diagram illustrating connectivity of circuit components in a power supply according to embodiments herein.

In this non-limiting example embodiment, the power supply 1500 includes controller 1540 and multiple phases 221 and 222 that collectively generate a respective output voltage 123 (output current) to power load 118. The load 118 can be any suitable circuit such as CPUs (Central Processing Units), GPUs and ASICs (such those including one or more Artificial Intelligence Accelerators), etc., which can be located on standalone circuit board or remote circuit board.

Note that power supply 1500 can include any number of phases. If desired, the phases can be split such that the first phase 221 powers a first load independent of the second phase 222 powering a second load. Alternatively, the combination of phase 221 and phase 222 drive the same load 118.

As shown in the example embodiment of operating a combination of the phase 221 and phase 222 to power the same load 118, phase 221 includes switch QA1, switch QB1, and inductive path 1531 (such as electrically conductive path 120-1). Phase 222 includes switch QA2, switch QB2, and inductive path 1532.

Further in this example embodiment, the voltage source 120-1 supplies voltage V1 (such as 6 VDC or any suitable voltage) to the series combination of switch QA1 (such as a high-side switch) and switch QB1 (such as a low-side switch).

In one embodiment, the combination of switch QA1 and QB1 as well as inductive path 1531 (inductor such as implemented via electrically conductive path 120-1 of circuit component 110) operate in accordance with a buck converter topology to produce the output voltage 123.

Further in this example embodiment, note that the drain node (D) of switch QA1 is connected to receive voltage V1 provided by voltage source 120-1. The source node (S) of switch QA1 is coupled to the drain node (D) of switch QB1 as well as the input node of inductive path 1531. The source node of switch QB1 is coupled to ground. The output node of the inductive path 1531 is coupled to the load 118.

Yet further in this example embodiment, the drain node of switch QA2 of phase 222 is connected to receive voltage V1 provided by voltage source 120-1. The source node (S) of switch QA2 is coupled to the drain node (D) of switch QB2 as well as the input node of inductive path 1532 (inductor such as implemented via electrically conductive path 120-2 of circuit component 110). The source node of switch QB2 is coupled to ground. The output node of the inductive path 1532 is coupled to the load 118.

As previously discussed, the combination of the phases 221 and 222 produces the output voltage 123 that powers load 118. That is, the inductive path 1531 produces output voltage 123; inductive path 1532 produces output voltage 123 as well.

During operation, as shown, controller 1540 produces control signals 105 (such as control signal A1 and control signal B1) to control states of respective switches QA1 and QB1. For example, the control signal A1 produced by the controller 1540 drives and controls the gate node of switch QA1; the control signal B1 produced by the controller 1540 drives and controls the gate node of switch QB1.

Additionally, controller 1540 produces control signals A2 and B2 to control states of switches QA2 and QB2. For example, the control signal A2 produced by the controller 1540 drives and controls the gate node of switch QA2; the control signal B2 produced by the controller 1540 drives and controls the gate node of switch QB2.

In one embodiment, the controller 1540 controls the phases 221 and 222 to be 180 degrees out of phase with respect to each other.

As is known with buck converters, in phase 221, activation of the high-side switch QA1 to an ON state while switch QB1 is deactivated (OFF) couples the input voltage V1 to the input of the inductive path 1531, causing an increase (such as ramped) in amount of current provided by the inductive path 1531 to the load 118. Conversely, activation of the low-side switch QB1 to an ON state while switch QA1 is deactivated (OFF) couples the ground reference voltage to the input of the inductive path 1531, causing a decrease (such as ramped) in amount of current provided by the inductive path 1531 to the load 118. The controller 1540 monitors a magnitude of the output voltage 123 and controls switches QA1 and QB1 such that the output voltage 123 stays within a desired voltage range.

Via phase 222, in a similar manner, activation of the high-side switch QA2 to an ON state while switch QB2 is deactivated (OFF) couples the input voltage V1 to the input of the inductive path 1532 causing an increase in amount of current provided by the inductive path 1532 to the load 118. Conversely, activation of the low-side switch QB2 to an ON state while switch QA2 is deactivated (OFF) couples the ground reference voltage to the input of the inductive path 1532, causing a decrease in amount of current provided by the inductive path 1532 to the load 118. The controller 1540 monitors a magnitude of the output voltage 123 and controls switches QA2 and QB2 such that the output voltage 123 stays within a desired voltage range.

Figure 14:
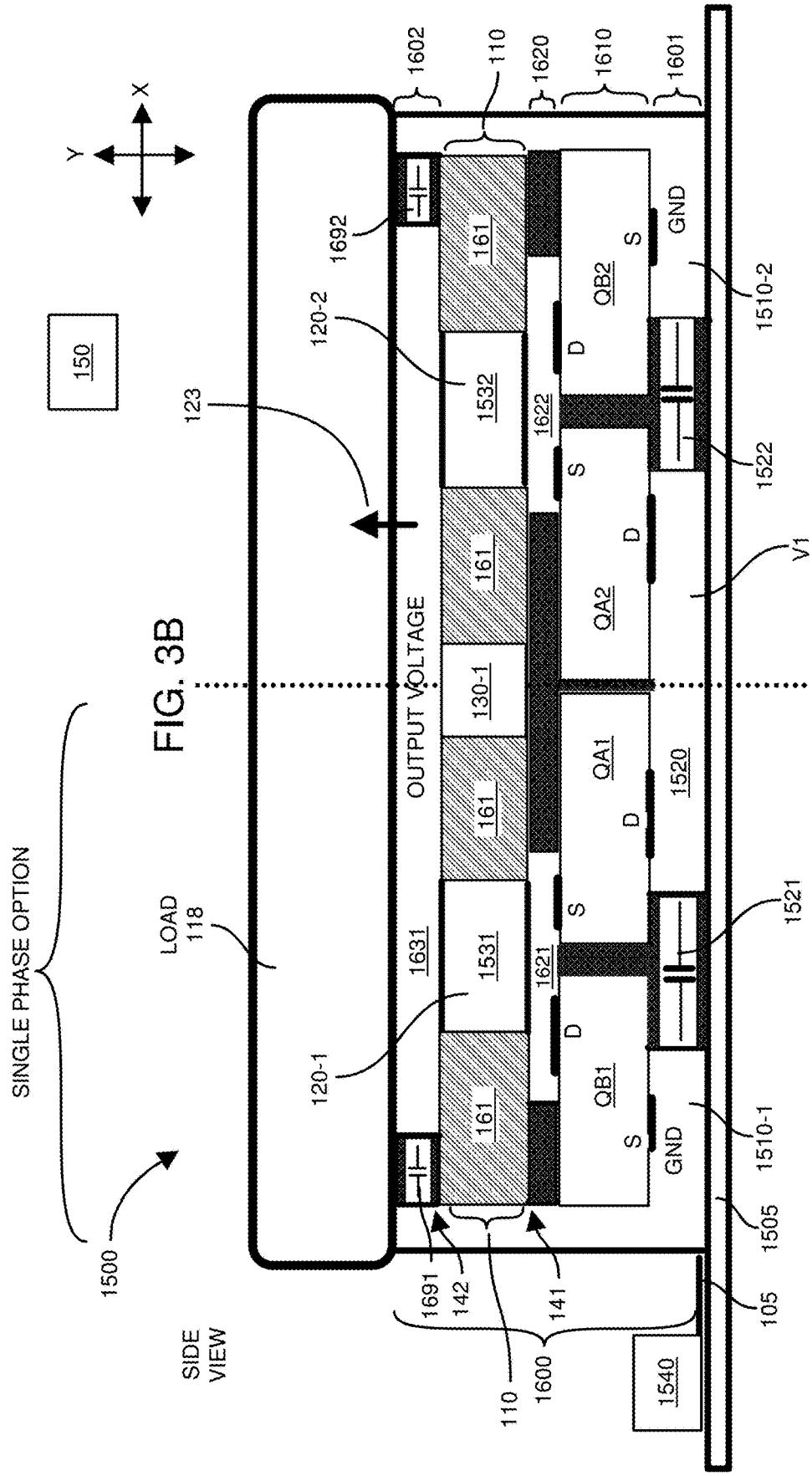
FIG. 14 is an example side view diagram illustrating a multi-phase power supply (in FIG. 13) and inductor hardware supporting vertical power flow according to embodiments herein.

FIG. 14 is an example side view diagram illustrating the multi-phase power supply of FIG. 13 instantiated in a vertical stack according to embodiments herein.

Further embodiments herein include receiving the circuit component 110 (such as including electrically conductive path 120-1 and electrically conductive path 120-2) as previously discussed.

A circuit board fabricator 140 or fabrication system disposes the circuit component 110 in a power converter affixed to a circuit board (such as substrate 1505). In one embodiment, the power converter (such as voltage regulator) is operative to convert an input voltage into an output voltage.

In further example embodiments, when installing the circuit component in the power converter, the fabricator 140 disposes a length-wise axis of the first electrically conductive path 120-1 (a.k.a., inductive path 1531 along Y-axis) to be orthogonal to a planar surface of the substrate 1505; and the fabrication system disposes a length-wise axis of the second electrically conductive path 120-2 (a.k.a., inductive path 1532 along Y-axis) to be orthogonal to the surface of the substrate 1505.

The instantiation of power supply 1500 in this example embodiment supports vertical power flow. For example, the substrate 1505 and corresponding one or more power sources such as V1 supply power to the power supply stack assembly 1600, which in turn powers the dynamic load 118. Ground reference (GND) conveyed through the power supply stack assembly 1600 provides a reference voltage and return path for current conveyed through the stack to the load 118. As previously discussed, the cutaway portions (such as cutaway portion 130-1, cutaway portion 130-2, etc.) associated with the circuit component 110 can be filled in with electrically conductive material that provides a respective path between the load 118 and the substrate 1505.

In one embodiment, the substrate 1505 is a circuit board (such as a standalone board, mother board, standalone board destined to be coupled to a mother board, etc.). The power supply stack assembly 1600 including one or more inductor devices is coupled to the substrate 1505. As previously discussed, the load 118 can be any suitable circuit such as CPUs (Central Processing Units), GPUs and ASICs (such those including one or more Artificial Intelligence Accelerators), which can be located on standalone circuit board.

Note that the inductive path 1531, 1532, etc., (instantiation of any of the inductor devices 110, etc., as discussed herein) in the power supply stack assembly 1600 can be instantiated in any suitable manner as described herein. In this non-limiting example embodiment, the power supply stack assembly 1600 includes one or more instantiation of any the inductor devices such as electrically conductive paths 120-1, 120-2, etc., as discussed herein. The power supply stack assembly 1600 can be configured to include any of number of the inductor devices (electrically conductive path) as described herein. In this example embodiment, the circuit component 110 includes two instances of electrically conductive paths 120-1 and 120-2.

Further in this example embodiment, the fabricator 140 fabricates power supply stack assembly 1600 (such as a DC-DC power converter) via stacking of multiple components including a first power interface 1601, one or more switches in switch layer 1610, connectivity layer 1620, one or more inductor assemblies (such as including circuit component 110 of inductor devices), and a second power interface 1602.

The fabricator 140 further disposes the first power interface 1601 at a base of the stack (power supply assembly 1600 of components). The base of power supply stack assembly 1600 (such as power interface 1601) couples the power supply stack assembly 1600 to the substrate 1505.

In one embodiment, fabricator 140 disposes capacitors 1521 and 1522 in a layer of the power supply stack assembly 1600 including the power interface 1601.

Yet further, when fabricating the power supply stack assembly 1600, the fabricator 140 electrically couples multiple switches such as switch QA1, QB1, QA2, and QB2 in the power supply stack assembly 1600 to the first power interface 1601. The first power interface 1601 and corresponding connectivity to the substrate 1505 enables the switches QA1, QB1, QA2, and QB2 to receive power such as power input such as input voltage V1 and GND reference voltage from the substrate 1505. One or more traces, power layers, etc., on substrate 1505 provide or convey the voltages from voltage (or power) sources to the power interface 1601 of the power supply stack assembly 1600.

As previously discussed, controller 1540 generates control signals 105 to control respective switches QA1, QB1, QA2, and QB2 in the power supply stack assembly 1600 (see FIG. 11 for interconnectivity). Fabricator 140 provides connectivity between the controller 1540 and the switches QA1, QB1, QA2, and QB2 in any suitable manner to convey respective signals 105.

Atop the switches in the switch layer 1610, the fabricator 140 further fabricates the power supply stack assembly 1600 to include one or more inductor devices as described herein. Additionally, via connectivity layer 1620, the fabricator 140 further connects the switches QA1, QB1, QA2, and QB2 to the one or more inductor devices 1531 (such as electrically conductive path 120-1), 1532 (such as electrically conductive path 120-2), etc.

More specifically, in this example embodiment, the fabricator 140 connects the source node (S) of switch QB1 to the ground reference node 1510-1 in the power interface 1601. Note that the ground reference node 1510-1 (such as ground reference return path connected to the dynamic load 118) extends from the substrate 1505 to the dynamic load 118 via L-shaped ground node 1510-1 (which is connected to the ground voltage reference). Additionally, or alternatively, as previously discussed, the cutaway portions filled with electrically conductive material also can be used to provide a return a path through the circuit component 110.

The fabricator 140 connects the drain node (D) of switch QB1 to node 1621 (such as fabricated from metal), which is electrically connected to the first end 141 of the inductive path 1531 (such as instantiation of electrically conductive path 120-1). Thus, via connectivity layer 1620, the fabricator 140 connects the drain node of the switch QB1 to the inductive path 1531.

The fabricator 140 connects the drain node (D) of switch QA1 to the voltage source node 1520 (which is electrically connected to the input voltage V1) of the first power interface 1601.

The fabricator 140 connects the source node (S) of switch QA1 to node 1621, which is electrically connected to the first end 141 of the inductive path 1531 (such as instantiation of electrically conductive path 120-1) as previously discussed. Thus, via connectivity layer 1620 and corresponding node 1621, the source node of the switch QA1 is connected to the inductive path 1531 of inductor device 110.

As further shown, the fabricator 140 connects the source node (S) of switch QB2 to the ground reference node 1510-2 in the power interface 1601. The ground reference node 1510-2 (current return path) extends from the substrate 1505 to the dynamic load 118 via L-shaped ground reference node 1510-2 (which is connected to the ground voltage reference). The fabricator 140 connects the drain node (D) of switch QB2 to node 1622 (such as fabricated from metal), which is electrically connected to the first end 141 of the inductive path 1532 (such as instantiation of electrically conductive path 131 or electrically conductive path 831). Thus, via connectivity layer 1620, the drain node of the switch QB2 is connected to the inductive path 1532 of inductor device 110.

Note that although each of the nodes 1510-1 and 1510-2 appear to be L-shaped from a side view of the power supply stack assembly 1600, in one embodiment, the node 1510 extends circumferentially about an outer surface of the power supply stack assembly 1600 (in a similar manner as electrically conductive path 133 as previously discussed). Additionally, or alternatively, as previously discussed, the cutaway portions of the circuit component 110 provide a way to convey voltages through the circuit component 110.

As further shown, the fabricator 140 connects the drain node (D) of switch QA2 to the voltage source node 1520 (which is connected to voltage V1) in the power interface 1601. The fabricator 140 connects the source node (S) of switch QA2 to node 1622, which is electrically connected to the first axial end 141 of the inductive path 1532 (instantiation of electrically conductive path 131 or electrically conductive path 831). Thus, via connectivity layer 1620 and corresponding node 1622, the source node of the switch QA2 is connected to the inductive path 1532 (such as electrically conductive path 120-2).

Accordingly, the fabricator 140 disposes the one or more switches (such as QA1, QB1, QA2, and QB2) in the power supply stack assembly 1600 between the first power interface 1601 and the inductor device 110.

In one non-limiting example embodiment, each of the one or more switches QA1, QB1, QA2, and QB2 in the power supply stack assembly 1600 is a vertical field effect transistor disposed between the first power interface 1601 and the inductor devices. However, additionally, or alternatively, note that one or more of switches QA1, QB1, QA2, and QB2 can be any suitable type of switches such as vertical or lateral field effect transistors, bipolar junction transistors, etc. It is also possible for lateral FETs, but vertical FETs are the ideal choice for this concept due to the flip chip method to minimize the current loop.

As previously discussed, the fabricator 140 fabricates the power supply stack assembly 1600 to include one or more inductor devices. In this example embodiment, the fabricator 140 disposes the multiple inductive paths 1531 (electrically conductive path 120-1) and inductive path 1532 (electrically conductive path 120-2) in the power supply stack assembly 1600 between the multiple switches QA1, QB1, QA2, and QB2 and the second power interface 1602.

In accordance with further embodiments, note that fabrication of the multiple inductive paths 1531 and 1532 includes: fabricating the multiple inductive paths to include a first inductive path 1531 (electrically conductive path 120-1) and a second inductive path 1532 (electrically conductive path 120-2) extending through core magnetic permeable material 161 of a respective inductor device 110 between the connectivity layer 1620 and the power interface 1602. In one embodiment, fabricator 140 fabricates each inductor device 1510 to include: i) core magnetic permeable material 161, the core magnetic permeable material being magnetic permeable ferromagnetic material, ii) an electrically conductive path 120-1 extending through the core material 161 from a first axial end of the electrically conductive path 120-1 to a second axial end 142 of the electrically conductive path 120-1.

Yet further in this example embodiment, the first inductive path 1531 is disposed in a first phase 221 (FIG. 11) of the power supply stack assembly 1600 (power converter circuit); the second inductive path 1532 is disposed in a second phase 222 (FIG. 11) of the power supply stack assembly 1600 (power converter circuit). During operation of the power converter (power supply stack assembly 1600), a combination of the first phase 221 and the second phase 222 disposed in parallel produce the output voltage 123. If desired, the controller 1540 can be fabricated into the power supply stack assembly 1600 as well.

In one embodiment, each of the one or more inductive paths 1531 (such as electrically conductive path 120-1) and 1532 (such as electrically conductive path 120-2) is a respective non-winding path extending from a first layer (such as switch layer 1610) in the stack including the multiple switches QA1, QB1, QA2, and QB2 to a second layer in the stack including the second power interface 1602.

Note that further embodiments herein include connecting multiple inductive paths in the inductor devices 1510 in parallel to increase an inductance of a respective inductive path. As described herein, any number of inductive paths can be connected in parallel to provide a desired overall inductance. Thus, in addition to controlling parameters such as permeability of the core material 161 of a respective circuit component 110, a respective length (between first end 141 and second end 142) of each non-winding electrically conductive path (such as straight or direct path) in the inductor device 110, embodiments herein also include connecting multiple inductive paths in parallel to control a magnitude of inductance provided by the respective inductor device 110. Also, as previously discussed, embodiments herein include fabricating the core material 161 in the inductor devices such that a magnitude of the magnetic permeability of the core varies with respect to a respective electrically conductive path providing connectivity between layer 1620 and 1602.

As further shown, the fabricator 140 disposes the inductor devices in the power supply stack assembly 1500 between the multiple switches (QA1, QB1, QA2, and QB2) in switch layer 1610 and the second power interface 1602.

More specifically, the fabricator 140 produces the power supply assembly 1600 to include a second power interface 1602. In one embodiment, the fabricator 140 connects the output axial end of the inductor devices (120-1 and 120-2) and corresponding nodes to the second power interface 1602. The second power interface 1602 is operable to receive the output voltage 123 produced by the inductor devices L1 (electrically conductive path 120-1) and L2 (electrically conductive path 120-2) and output it to the load 118. The fabricator 140 couples the output nodes of both the inductive path 1531 and inductive path 1532 to the output voltage node 1631 (such as a layer of material such as metal). Thus, the output voltage node 1631 is electrically connected to the output of the respective inductive paths 1531 and 1532.

As its name suggests, the output voltage node 1631 conveys the output voltage 123 to power the load 118.

In one embodiment, one or more nodes or pins, pads, etc., of the dynamic load 118 are coupled to the output voltage node 1631. For example, output voltage node 1631 of the power supply stack assembly 1500 conveys the output voltage 123 produced by each of the inductive paths 1531 and 1532 to the one or more nodes, pins, pads, etc., of the load 118.

Accordingly, via switching of the inductive paths between the ground voltage and the input voltage V1, the combination of inductive paths 1531 and 1532 collectively produces the output voltage 123 to power the load 118.

As previously discussed, power supply stack assembly 1600 further includes ground node 1510-1 and 1510-2. In one embodiment, the instantiation of electrically conductive path 1510-1 and 1510-2 (such as ground nodes) provide perimeter electromagnetic shielding with respect to power supply stack assembly 1600, preventing or reducing corresponding radiated emissions into the surrounding environment.

In yet further embodiments, the fabricator 140 fabricates the first power interface 1601 to include first contact elements operable to connect the first power interface 1601 at the base of the power supply stack assembly 1600 to a host substrate 1505. The fabricator 140 fabricates the second power interface 1602 to include second contact elements operable to affix a dynamic load 118 to the power supply stack assembly 1600.

Note that power supply stack assembly 1500 is fabricated to further include first capacitors 1521, 1522, etc., providing connectivity between the input voltage node 1520 (first electrically conductive path supplying input voltage V1 to the power supply stack assembly 1600) and ground nodes 1510-1 and 1510-2 (such as second electrically conductive path supplying the ground reference voltage to the power supply stack assembly 1600).

The fabricator 140 further disposes output voltage node 1631 (such as another electrically conductive path) in the layer of the power supply stack assembly 1602 including the second power interface 1602. As previously discussed, the output voltage node 1631 (such as layer of metal) is operable to convey the output voltage 123 to the dynamic load 118.

In accordance with further embodiments, the fabricator 140 fabricates the power supply stack assembly 1600 to include second capacitors (1691, 1692, etc.) connected between the output voltage node 1631 and a respective ground node 1510. More specifically, capacitor 1691 is coupled between output voltage node 1631 and the ground node 1510-1; capacitor 1692 is coupled between output voltage node 1631 and the ground node 1510-2.

Further embodiments herein include affixing a dynamic load 118 to the second power interface 1602. Accordingly, the dynamic load 118 is affixed atop the power supply stack assembly 1600.

The power supply stack assembly 1600 (assembly of components such as a vertical stack) as described herein provides advantages over conventional power converters. For example, the power supply stack assembly 1600 as described herein provides novel connectivity of components in an assembly (such as via stacking), resulting in shorter circuit paths and lower losses when converting and delivering power to the dynamic load 118.

As previously discussed with respect to FIG. 11, during operation, the inductor devices L1 and L2 and corresponding inductive paths 1531 and 1532 are operable to produce an output voltage 123 based on the received power (current supplied by input voltage, V1). In other words, the power supply stack assembly 1600 and corresponding fabricated stack of components (such as first power interface 1601, one or more switches QA1, QB1, QA2, and QB2, inductor device 110, second power interface 1602) is a power converter operable to convert an input voltage V1 (such as a DC voltage) received at the first power interface 1601 into the output voltage 123 (such as a DC voltage) outputted from the second power interface 1602 to the dynamic load 118.

Further embodiments herein include fabrication of the system. For example, embodiments herein include a fabricator 140. The fabricator 140 receives a substrate 1505 such as a circuit board; the fabricator 140 affixes a base (such as interface 1601) of the stack of components (such as a power supply stack assembly 1600) to the circuit board. As previously discussed, the stack of components (power supply stack assembly 1600) is operative to generate an output voltage 123 to power a load 118. The load 118 is either affixed to the circuit board or the load 118 is affixed atop the power supply stack assembly 1600.

Further, as previously discussed, the load 118 can be any suitable circuit such as CPUs (Central Processing Units), GPUs and ASICs (such those including one or more Artificial Intelligence Accelerators), which can be located on standalone circuit board.

Figure 15:
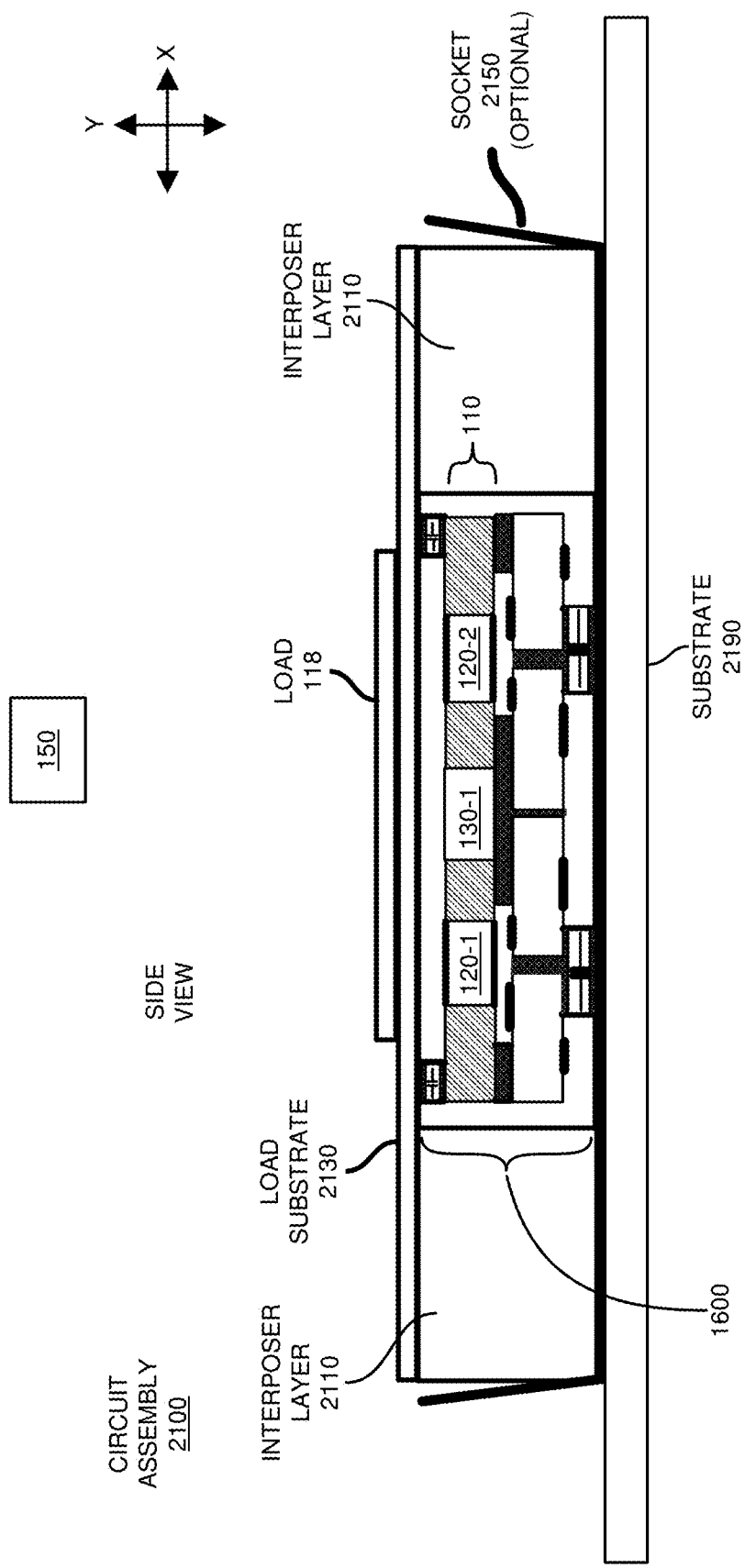
FIG. 15 is an example side view diagram illustrating a multi-phase power supply (in FIG. 13) and inductor hardware supporting vertical power flow according to embodiments herein.

FIG. 15 is an example diagram illustrating a circuit assembly according to embodiments herein.

As shown in this example embodiment, circuit assembly 2100 includes power supply stack assembly 1600 disposed in an interposer layer 2110. The interposer layer 2110 provides circuit path connectivity between the substrate 2190 and the load substrate 2130 (and load 118).

In a manner as previously discussed, the power supply stack assembly (1600) receives an input voltage (and any other voltage reference signals such as ground, and/or V1, V2, etc.) from the substrate 2190. The power supply stack assembly (1600) converts the input voltage into an output voltage 123 (and/or output current) that powers the respective load 118 and/or other circuit components disposed on the load substrate 2130.

In one embodiment, the substrate 2190 is a Printed Circuit Board (PCB) substrate, although substrate 2190 can be any suitable component to which socket 2150 (optional) or interposer layer 2110 is connected. Via insertion into socket 2150, the interposer layer 2110 is in communication with the substrate 2190. In the absence of socket 2150, the interposer layer 2110 is connected directly to the substrate 2190.

Figure 16:
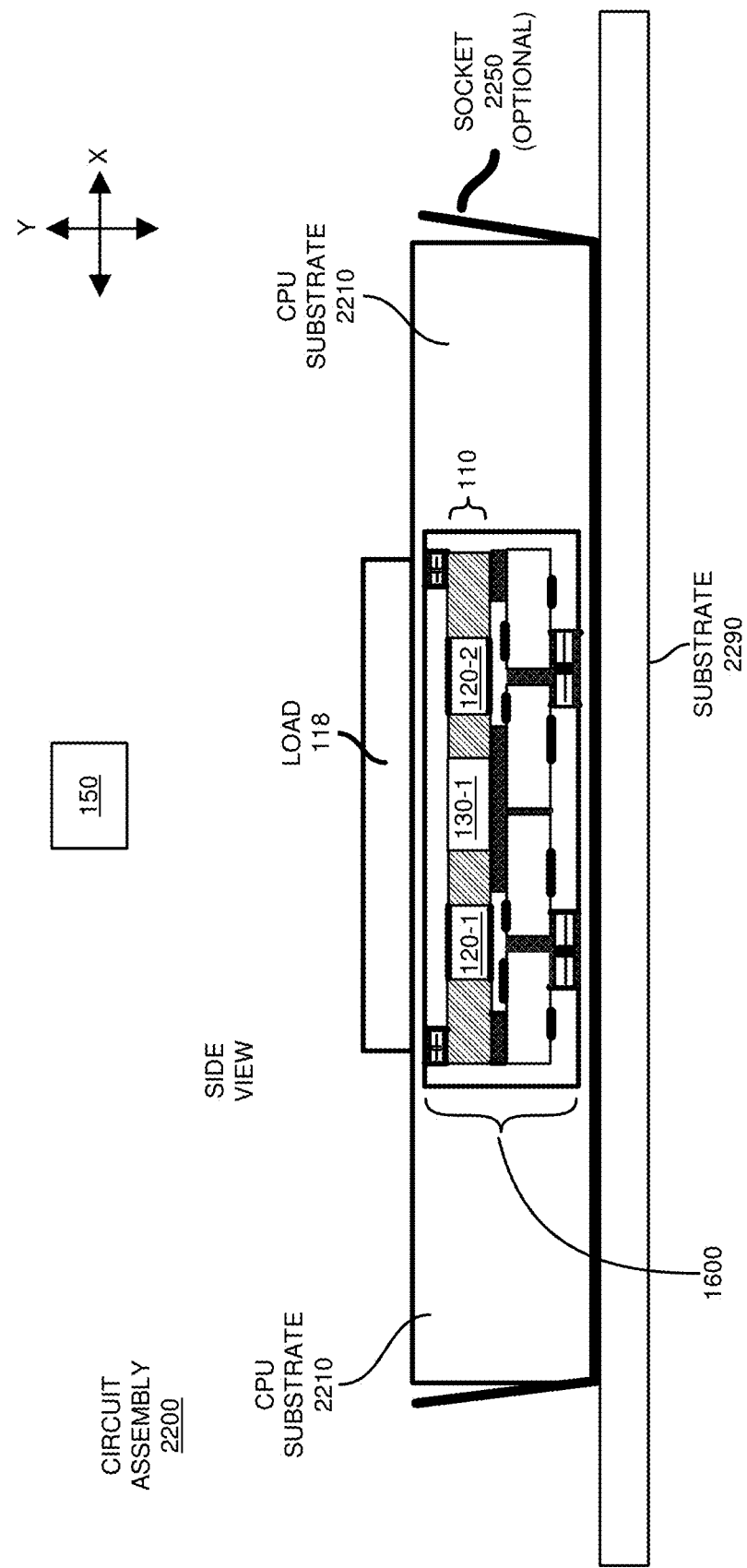
FIG. 16 is an example side view diagram illustrating a multi-phase power supply (in FIG. 13) and inductor hardware supporting vertical power flow according to embodiments herein.

FIG. 16 is an example diagram illustrating a circuit assembly according to embodiments herein.

As shown in this example embodiment, circuit assembly 2200 includes power supply stack assembly 1600 disposed in a CPU (Central Processing Unit) substrate 2210. In one embodiment, the power supply stack assembly 1600 is integrated into the laminate portion of the CPU substrate 2210 itself. The CPU substrate 2210 provides circuit path connectivity between the substrate 2290 and the load 118 (and other components connected to the CPU substrate load 2120).

In a manner as previously discussed, the power supply stack assembly (1600) receives an input voltage (and any other voltage reference signals such as ground, and/or voltages V1, V2, etc.) from the substrate 2290. The power supply stack assembly (1600) converts the input voltage into an output voltage (and/or output current) that powers the respective load 118 and/or other circuit components disposed on the load CPU substrate 2210.

In one embodiment, the substrate 2290 is a Printed Circuit Board (PCB) substrate, although substrate 2290 can be any suitable component to which socket 2250 (optional) or CPU substrate 2210 is directly connected. Via insertion into socket 2250, the CPU substrate layer 2210 and power supply stack assembly is in communication with the substrate 2290. In the absence of socket 2250, the CPU substrate 2210 is connected directly to the substrate 2290.

Figure 17:
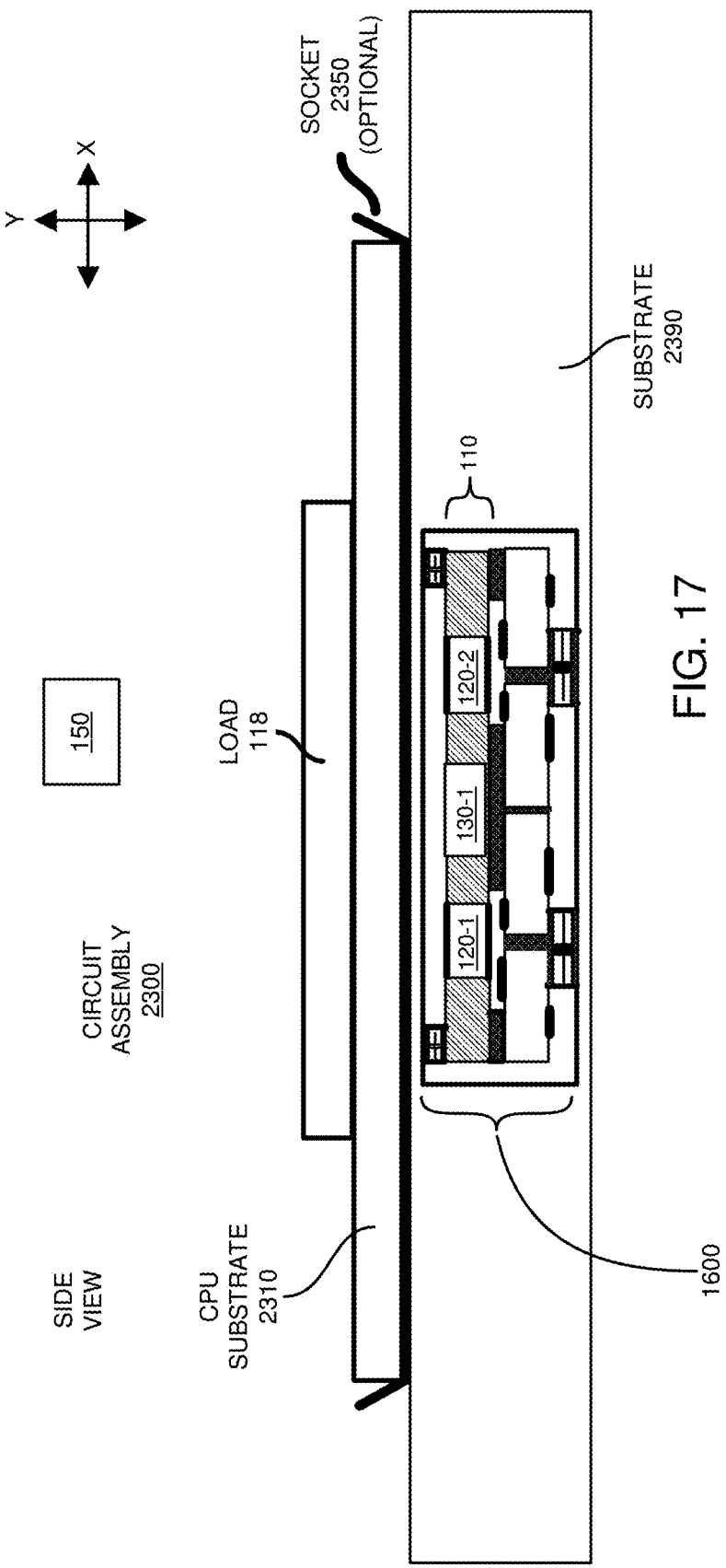
FIG. 17 is an example side view diagram illustrating a multi-phase power supply (in FIG. 13) and inductor hardware supporting vertical power flow according to embodiments herein.

FIG. 17 is an example diagram illustrating a circuit assembly according to embodiments herein.

As shown in this example embodiment, circuit assembly 1900 includes power supply stack assembly 1600 disposed in substrate 2390 such as a circuit board (such as a printed circuit board).

In one embodiment, the power supply stack assembly 1600 is embedded or fabricated in an opening of the substrate 2390. In other words, in one embodiment, the power supply stack assembly 1600 (converter unit) is fabricated (inserted) into an opening below the CPU substrate 2310. The CPU substrate 2310 provides circuit path connectivity between the substrate 2390 and the load 128 (and/or other components connected to the CPU substrate load 1910).

In a manner as previously discussed, the power supply stack assembly (1600) receives an input voltage (and any other voltage reference signals such as ground, and/or V1, V2, etc.) from the substrate 2390. The power supply stack assembly (1600) converts the input voltage into an output voltage (and/or output current) that powers the respective load 118 and/or other circuit components disposed on the load CPU substrate 2310.

In one embodiment, the substrate 2390 is a Printed Circuit Board (PCB) substrate, although substrate 2390 can be any suitable component to which socket 2350 (optional) or CPU substrate 2310 is directly connected. In one embodiment, via insertion into socket 2350, the CPU substrate 2310 is in communication with the substrate 2390. In the absence of socket 2350, the CPU substrate 2310 is connected directly to the substrate 2390.

Embodiments herein introduce a two-dimensional arrangement with n rows and m columns (or alternatively k single-turn inductors arranged in a close-packed arrangement) of single-turn inductors in a purely vertical power flow arrangement. There are three distinct embodiments with:
  a) All inductors sharing one magnetic core
  b) Groups of inductors sharing one magnetic core; the entire solution consists of more than one magnetic core
  c) Each inductor having its own magnetic core Note further that the inductor device (circuit component 110) as discussed herein may have one or several (e.g. distributed across the cross section of the core) airgaps. An airgap is a region spanning out to the entire cross section of the magnetic core with a relative permeability of very close to 1. The concept of an airgap can be extended into regions with a very low permeability such as <10. A distributed airgap is a core with several very thin airgaps. The preferred embodiment of this invention disclosure is an inductor without any airgap but with cutouts (cutaway portions).

Further embodiments herein include controlling coupling between phases (electrically conductive paths) and the equalizing electric return path by means of geometric arrangements and asymmetric physical layouts.

Figure 18:
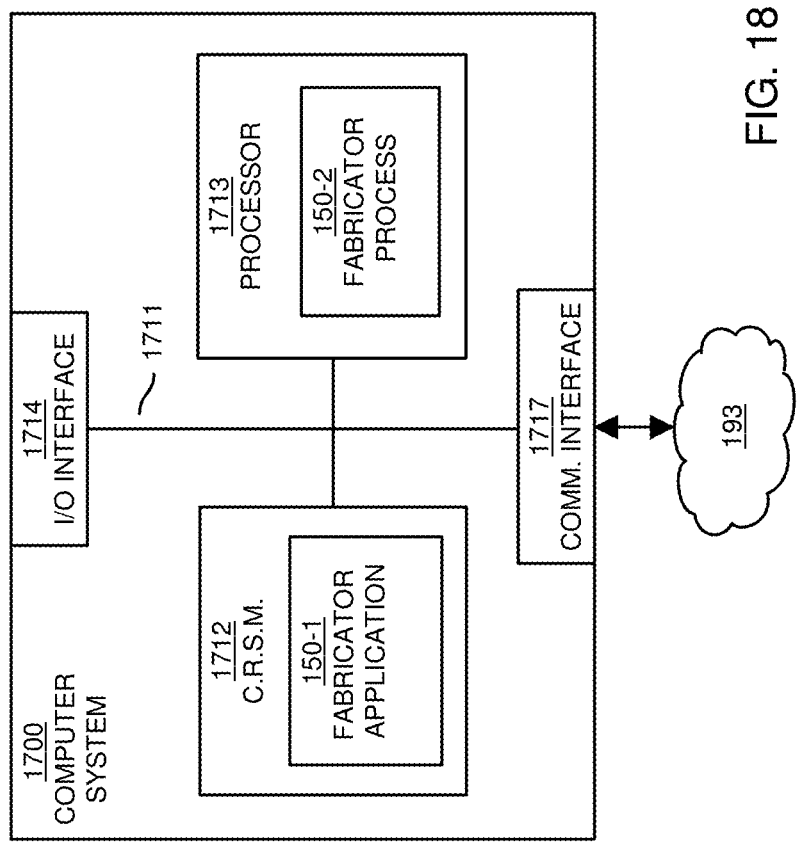
FIG. 18 is an example diagram illustrating example computer architecture (fabricator system, fabricator hardware, etc.) operable to execute one or more methods according to embodiments herein.

FIG. 18 is a diagram illustrating example computer architecture operable to execute one or more methods according to embodiments herein.

As previously discussed, any of the resources (such as fabricator 140, etc.) as discussed herein can be configured to include computer processor hardware and/or corresponding executable instructions to carry out the different operations as discussed herein.

As shown, computer system 1700 of the present example includes an interconnect 1711 that couples computer readable storage media 1712 such as a non-transitory type of media (which can be any suitable type of hardware storage medium in which digital information can be stored and retrieved), a processor 1713 (computer processor hardware), I/O interface 1714, and a communications interface 1717.

I/O interface(s) 1714 supports connectivity to external hardware such as a keyboard, display screen, repository, fabrication equipment, etc.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with fabricator application 150-1 (e.g., including instructions) to carry out any of the operations as discussed herein.

During operation of one embodiment, processor 1713 accesses computer readable storage media 1712 via the use of interconnect 1711 in order to launch, run, execute, interpret or otherwise perform the instructions in fabricator application 150-1 stored on computer readable storage medium 1712. Execution of the fabricator application 150-1 produces fabricator process 150-2 to carry out any of the operations and/or processes as discussed herein.

Those skilled in the art will understand that the computer system 1700 can include other processes and/or software and hardware components, such as an operating system that controls allocation and use of hardware resources to execute fabricator application 150-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1700 may reside at any location or can be included in any suitable resource in any network environment to implement functionality as discussed herein.

Figure 19:
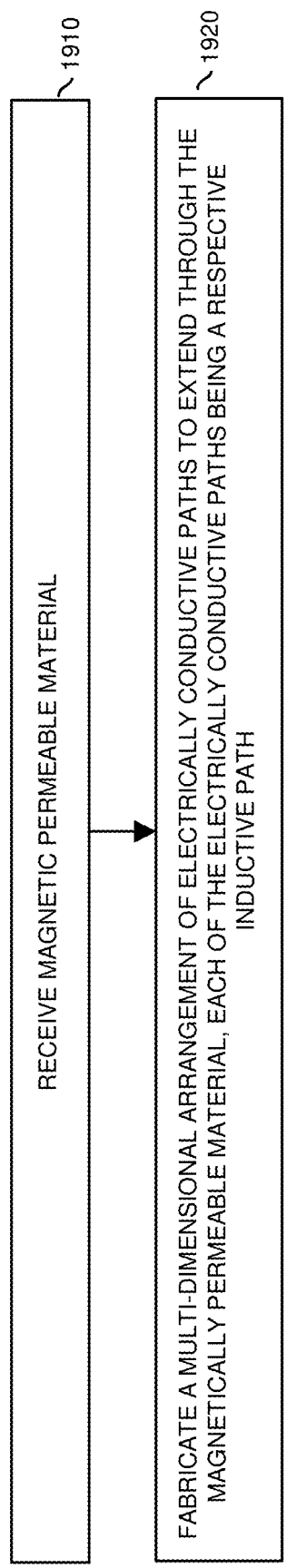
FIG. 19 is an example diagram illustrating a method according to embodiments herein.

Functionality supported by one or more resources as described herein are discussed via flowchart in FIG. 19. Note that the steps in the flowcharts below can be executed in any suitable order.

FIG. 19 is a flowchart 1900 illustrating an example method according to embodiments herein. Note that there will be some overlap with respect to concepts as discussed above.

In processing operation 1910, the fabricator 140 receives magnetic permeable material 161.

In processing operation 1920, the fabricator 140 fabricates a multi-dimensional arrangement of electrically conductive paths 120 to extend through the magnetically permeable material 161. Each of the electrically conductive paths 120 is a respective inductive path.

Note again that techniques herein are well suited for use in fabrication of inductor devices and corresponding implementation in power converter applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   magnetic permeable material;
   a multi-dimensional arrangement of electrically conductive paths;
   each of the electrically conductive paths being a respective inductive path extending through the magnetic permeable material;
   wherein the electrically conductive paths in the multi-dimensional arrangement include a first electrically conductive path and a second electrically conductive path disposed along a first axis; and
   wherein the electrically conductive paths include a third electrically conductive path in the multi-dimensional arrangement offset with respect to the first axis.

2. The apparatus as in claim 1,
   wherein the magnetic permeable material is fabricated to include at least one cutaway portion operative to reduce inductive coupling between the first electrically conductive path and the second electrically conductive path, the magnetic permeable material being absent from the at least one cutaway portion.

3. The apparatus as in claim 1, wherein each of the electrically conductive paths is a single turn inductor device.

4. The apparatus as in claim 1,
   wherein a height of the magnetic permeable material with respect to the first electrically conductive path is different than a height of the magnetic permeable material with respect to the second electrically conductive path.

5. The apparatus as in claim 1,
   wherein dimensions of the magnetic permeable material surrounding the first electrically conductive path is different than dimensions of the magnetic permeable material surrounding the second electrically conductive path.

6. The apparatus as in claim 1,
   wherein a volumetric shape of the magnetic permeable material surrounding the first electrically conductive path is different than a volumetric shape of the magnetic permeable material surrounding the second electrically conductive path.

7. The apparatus as in claim 1,
   wherein a cross-sectional area of the first electrically conductive path as viewed along a lengthwise axis of the first electrically conductive path is different than a cross-sectional area of the second electrically conductive path as viewed along a lengthwise axis of the second electrically conductive path.

8. The apparatus as in claim 1, wherein the multi-dimensional arrangement of electrically conductive paths includes:
   a first set of electrically conductive paths;
   a first set of cells, each cell in the first set of cells including an electrically conductive path of the first set of electrically conductive paths, each of the electrically conductive paths in the first set of electrically conductive paths enveloped by the magnetic permeable material to form a respective cell of the first set of cells;
   a first portion of electrically conductive material enveloping the first set of cells;
   a second set of electrically conductive paths;
   a second set of cells, each cell in the second set of cells including an electrically conductive path of the second set of electrically conductive paths, each of the electrically conductive paths in the second set of electrically conductive paths enveloped by the magnetic permeable material to form a respective cell of the second set of cells; and
   a second portion of electrically conductive material enveloping the second set of cells.

9. The apparatus as in claim 8 further comprising:
   a first cutaway portion disposed at a center of the first set of cells, the magnetic permeable material being absent from the first cutaway portion; and
   a second cutaway portion disposed at a center of the second set of cells, the magnetic permeable material being absent from the second cutaway portion.

10. The apparatus as in claim 9, wherein a diameter of the first electrically conductive path is larger than a diameter of the second electrically conductive path, the first electrically conductive path and the second electrically conductive path included in the first set of electrically conductive paths.

11. The apparatus as in claim 8 further comprising:
    at least one cutaway portion disposed between the first set of cells and the second set of cells, the magnetic permeable material being absent from the at least one cutaway portion.

12. The apparatus as in claim 8 further comprising:
    multiple cutaway portions disposed at a perimeter of the first set of cells, the magnetic permeable material being absent from the multiple cutaway portions.

13. The apparatus as in claim 1,
    wherein the first electrically conductive path is enveloped by a first portion of the magnetic permeable material to form a first cell;

wherein the second electrically conductive path is enveloped by a second portion of the magnetic permeable material to form a second cell, the second cell being larger than the first cell.

14. The apparatus as in claim 1, wherein the electrically conductive paths further include a fourth electrically conductive path and a fifth electrically conductive path extending through the magnetic permeable material.

15. The apparatus as in claim 14, wherein the multidimensional arrangement includes alignment of the first electrically conductive path, the second electrically conductive path, and the fourth electrically conductive path along the first axis.

16. The apparatus as in claim 15, wherein the multidimensional arrangement includes alignment of the first electrically conductive path, the third electrically conductive path, and the fifth electrically conductive path along a second axis.

17. The apparatus as in claim 16, wherein the second axis is disposed orthogonal to the first axis.

18. The apparatus as in claim 1, wherein the electrically conductive paths further include a fourth electrically conductive path; and
wherein the third electrically conductive path and the fourth electrically conductive path are disposed along a second axis.

19. The apparatus as in claim 18, wherein the second axis is disposed parallel to the first axis.

20. The apparatus as in claim 1, wherein the first electrically conductive path extends axially along a second axis through the magnetic permeable material, the second axis being orthogonal to the first axis;
wherein an axial length of the second electrically conductive path extends through the magnetic permeable material in parallel with the second axis; and
wherein an axial length of the third electrically conductive path extends through the magnetic permeable material in parallel with the second axis.

21. An apparatus comprising:
magnetic permeable material;
a multi-dimensional arrangement of electrically conductive paths;
each of the electrically conductive paths being a respective inductive path extending through the magnetic permeable material; and
wherein the magnetic permeable material includes a first magnetic permeable material and a second magnetic permeable material, the first magnetic permeable material having a first magnetic permeability, the second magnetic permeable material having a second magnetic permeability.

22. An apparatus comprising:
magnetic permeable material;
a multi-dimensional arrangement of electrically conductive paths;
each of the electrically conductive paths being a respective inductive path extending through the magnetic permeable material;
wherein the electrically conductive paths include a first electrically conductive path, a second electrically conductive path, and a third electrically conductive path, the apparatus further comprising:
a first cell in which the first electrically conductive path resides, the first cell defined at least in part by a first portion of the magnetic permeable material surrounding the first electrically conductive path;
a second cell in which the second electrically conductive path resides, the second cell defined at least in part by a second portion of the magnetic permeable material surrounding the second electrically conductive path; and
a third cell in which the third electrically conductive path resides, the third cell defined at least in part by a third portion of the magnetic permeable material, the third cell being offset with respect to an axis between the first cell and the second cell.

23. The apparatus as in claim 22 further comprising:
a cutaway portion disposed between the first cell and the third cell, the magnetic permeable material being absent from the cutaway portion.

24. The apparatus as in claim 23, wherein the cutaway portion is at least partially filled with material.

25. An apparatus comprising:
magnetic permeable material;
a multi-dimensional arrangement of electrically conductive paths;
each of the electrically conductive paths being a respective inductive path extending through the magnetic permeable material; and
wherein each of the electrically conductive paths is disposed in a respective cell of the magnetic permeable material, each respective cell individually enveloped by electrically conductive material.

26. A method comprising:
receiving a substrate;
fabricating the apparatus in claim 1 as part of a voltage regulator circuit coupled to the substrate.

27. A method comprising:
receiving the apparatus of claim 1; and
disposing the apparatus in a power converter affixed to a circuit substrate, the power converter operative to convert an input voltage into an output voltage.

28. A method comprising:
receiving magnetic permeable material;
fabricating a multi-dimensional arrangement of electrically conductive paths to extend through the magnetic permeable material, each of the electrically conductive paths being a respective inductive path;
wherein the electrically conductive paths include a first electrically conductive path and a second electrically conductive path disposed along a first axis; and
wherein the electrically conductive paths include a third electrically conductive path, the third electrically conductive path being offset with respect to the first axis.

29. The method as in claim 28 further comprising:
fabricating the magnetic permeable material to include at least one cutaway portion to reduce inductive coupling between the first electrically conductive path and the second electrically conductive path, the magnetic permeable material being absent from at least one cutaway portion.

30. The method as in claim 28, wherein
each of the electrically conductive paths is a single turn inductor device in the multi-dimensional arrangement of multiple electrically conductive paths.

31. The method as in claim 28 further comprising:
fabricating a height of the magnetic permeable material with respect to the first electrically conductive path to be different than a height of the magnetic permeable material with respect to the second electrically conductive path.

32. The method as in claim 28 further comprising:
fabricating dimensions of the magnetic permeable material surrounding the first electrically conductive path to be different than dimensions of the magnetic permeable material surrounding the second electrically conductive path.

33. The method as in claim 1 further comprising:
fabricating a volumetric shape of the magnetic permeable material surrounding the first electrically conductive path to be different than a volumetric shape of the magnetic permeable material surrounding the second electrically conductive path.

34. The method as in claim 28 further comprising:
fabricating the magnetic permeable material to include a first magnetic permeable material and a second magnetic permeable material, the first magnetic permeable material having a first magnetic permeability, the second magnetic permeable material having a second magnetic permeability.

35. The method as in claim 28 further comprising:
fabricating the multi-dimensional arrangement to include a first cell in which the first electrically conductive path resides, the first cell defined at least in part by a first portion of the magnetic permeable material surrounding the first electrically conductive path;
fabricating the multi-dimensional arrangement to include a second cell in which the second electrically conductive path resides, the second cell defined at least in part by a second portion of the magnetic permeable material surrounding the first electrically conductive path; and
fabricating the multi-dimensional arrangement to include a third cell in which the third electrically conductive path resides, the third cell defined at least in part by a third portion of the magnetic permeable material, the third cell offset with respect to an axis between the first cell and the second cell.

36. The method as in claim 35 further comprising:
disposing cutaway portion between the first cell and the third cell, the magnetic permeable material being absent from the cutaway portion.

37. The method as in claim 36 further comprising:
at least partially filling the cutaway portion with material.

38. The method as in claim 36, wherein each of the electrically conductive paths is disposed in a respective cell of the magnetic permeable material, the method further comprising:
enveloping each respective cell with electrically conductive material.

39. The method as in claim 28 further comprising:
fabricating the multi-dimensional arrangement of electrically conductive paths to include:
a first set of electrically conductive paths, each of the electrically conductive paths in the first set enveloped by the magnetic permeable material to form a first set of cells, the first set of cells enveloped by a first portion of electrically conductive material; and
a second set of electrically conductive paths, each of the electrically conductive paths in the second set enveloped by the magnetic permeable material to form a second set of cells, the second set of cells enveloped by a second portion of the electrically conductive material.

\* \* \* \* \*